United States Patent [19]

Handfield et al.

[11] Patent Number: 5,581,023

[45] Date of Patent: Dec. 3, 1996

[54] PRESSURE TRANSDUCER FOR MONITORING A PNEUMATIC TIRE

[76] Inventors: Michael Handfield; Helene Laliberte, both of 910 Sherwood Ct., Rochester, Mich. 48307

[21] Appl. No.: 480,698

[22] Filed: Jun. 7, 1995

Related U.S. Application Data

[62] Division of Ser. No. 332,200, Oct. 31, 1994, abandoned.

[51] Int. Cl.$^6$ .................................................. B60C 23/00
[52] U.S. Cl. ........................... 73/146.5; 73/721; 73/727; 73/715
[58] Field of Search .................. 73/146, 146.2, 73/146.3, 146.4, 146.5, 146.8, 721, 715, 727, 744, 745

[56] References Cited

U.S. PATENT DOCUMENTS

| | | | |
|---|---|---|---|
| Re. 34,095 | 10/1992 | Padula et al. ................... | 178/18 |
| 3,247,719 | 4/1966 | Chelner ............................ | 73/420 |
| 3,261,001 | 7/1966 | Magnin ........................... | 340/172.5 |
| 3,309,463 | 3/1967 | Roedl .............................. | 178/69.5 |
| 3,329,934 | 7/1967 | Wooden .......................... | 340/58 |
| 3,596,509 | 8/1971 | Raffaelli ......................... | 73/146.3 |
| 3,705,385 | 12/1972 | Batz ............................... | 340/152 R |
| 3,806,471 | 4/1974 | Mitchell ......................... | 252/518 |
| 3,810,090 | 5/1974 | Davis, Jr. et al. ............... | 340/58 |
| 3,890,595 | 6/1975 | Barabino ........................ | 340/58 |
| 3,993,939 | 11/1976 | Slavin et al. .................... | 317/246 |
| 4,048,614 | 9/1977 | Shumway ....................... | 340/58 |
| 4,054,540 | 10/1977 | Michalchik ..................... | 252/512 |
| 4,057,783 | 11/1977 | Blanchler ....................... | 340/58 |
| 4,067,235 | 1/1978 | Markland et al. ............... | 73/146.5 |
| 4,074,227 | 2/1978 | Kalmus .......................... | 340/58 |
| 4,101,872 | 7/1978 | Pappas ............................ | 340/58 |
| 4,104,595 | 8/1978 | Overzet ........................... | 328/1 |
| 4,119,944 | 10/1978 | Smith ............................. | 340/58 |
| 4,137,520 | 1/1979 | Deveau ........................... | 340/58 |
| 4,160,234 | 7/1979 | Karbo et al. .................... | 340/58 |
| 4,186,377 | 1/1980 | Barabino ........................ | 340/58 |
| 4,237,728 | 12/1980 | Betts et al. ...................... | 73/146.5 |
| 4,263,579 | 4/1981 | Corgan et al. .................. | 340/58 |
| 4,276,538 | 6/1981 | Eventoff et al. ................ | 338/69 |
| 4,276,540 | 6/1981 | Habib, Jr. ....................... | 340/63 |
| 4,300,118 | 11/1981 | Matsuda et al. ................ | 340/58 |
| 4,301,337 | 11/1981 | Eventoff ......................... | 200/5 A |
| 4,308,520 | 12/1981 | Darlington ..................... | 73/146.8 |
| 4,310,014 | 1/1982 | Parker ............................. | 73/146.8 |

(List continued on next page.)

FOREIGN PATENT DOCUMENTS

| | | |
|---|---|---|
| 0251355 | 1/1988 | European Pat. Off. . |
| 0344003 | 11/1989 | European Pat. Off. . |
| 0431217 | 6/1991 | European Pat. Off. . |
| 2225300 | 11/1974 | France . |
| 2601533 | 1/1988 | France . |
| 3703128 | 8/1988 | Germany . |
| 2210537 | 6/1989 | United Kingdom . |

*Primary Examiner*—Richard Chilcot
*Assistant Examiner*—George M. Dombroske
*Attorney, Agent, or Firm*—Brooks & Kushman P.C.

[57] ABSTRACT

A pressure transducer for use with a pneumatic tire monitoring system includes a non-conductor resilient layer and a piezo-resistive/variably conductive layer having a composition which provides substantially constant resistant while under a substantially constant load. In a preferred embodiment, the piezo-resistive/variably conductive layer includes N-type semiconductor material, molybdenum disulfide, titanium, bismuth oxide, and alkyd or silicone binder. The transducer also includes conductive elements which are attached to a nonconductive substraight and electrically insulated from each other. The piezo-resistive/conductive layer contacts at least two of the conductive elements with a surface area which is responsive to a change in pressure so as to produce a variable resistant/conductives between the conductive elements. In one embodiment, the piezo-resistive/conductive layer is hemispherically shaped and divided to produce two independent sensing transducers. The output of these transducers may be combined to improve the response linearity of the transducer. One embodiment utilizes a log/anti-log circuit and a differential amplifier to combine the output of the separate but integral transducers.

21 Claims, 19 Drawing Sheets

U.S. PATENT DOCUMENTS

| | | | |
|---|---|---|---|
| 4,313,483 | 2/1982 | Brockmann | 152/416 |
| 4,314,227 | 2/1982 | Eventoff | 338/99 |
| 4,314,228 | 2/1982 | Eventoff | 338/114 |
| 4,314,230 | 2/1982 | Cardinal et al. | 338/314 |
| 4,316,176 | 2/1982 | Gee et al. | 340/58 |
| 4,328,494 | 5/1982 | Goodall | 340/870.18 |
| 4,334,215 | 6/1982 | Frazier et al. | 340/539 |
| 4,451,714 | 5/1984 | Eventoff | 200/5 A |
| 4,467,641 | 8/1984 | Abraham | 73/146.5 |
| 4,468,650 | 8/1984 | Barbee | 340/58 |
| 4,489,599 | 12/1984 | Andrei-Alexandru et al. | 73/146.5 |
| 4,494,106 | 1/1985 | Smith et al. | 340/58 |
| 4,510,484 | 4/1985 | Snyder | 340/58 |
| 4,531,112 | 7/1985 | Thomas | 340/58 |
| 4,554,528 | 11/1985 | Burkel et al. | 340/58 |
| 4,571,588 | 2/1986 | Lee et al. | 340/870.13 |
| 4,619,137 | 10/1986 | Bott | 73/146.5 |
| 4,644,317 | 2/1987 | Aingworth | 73/146.8 |
| 4,693,112 | 9/1987 | Ferris | 73/146.8 |
| 4,695,823 | 9/1987 | Vernon | 340/58 |
| 4,703,650 | 11/1987 | Dosjoub et al. | 73/146.5 |
| 4,711,130 | 12/1987 | Glas et al. | 73/708 |
| 4,717,905 | 1/1988 | Morrison, Jr. et al. | 340/58 |
| 4,723,445 | 2/1988 | Ripley et al. | 73/146.3 |
| 4,737,761 | 4/1988 | Dosjoub et al. | 340/58 |
| 4,742,857 | 5/1988 | Gandhi | 152/418 |
| 4,747,761 | 5/1988 | Yumiyama et al. | 418/46 |
| 4,749,993 | 6/1988 | Szabo et al. | 340/870.31 |
| 4,816,802 | 5/1989 | Doerksen et al. | 340/447 |
| 4,823,107 | 4/1989 | Pompier | 340/442 |
| 4,853,690 | 8/1989 | Mayer et al. | 340/544 |
| 4,875,378 | 10/1989 | Yamazaki et al. | 73/862.04 |
| 4,891,973 | 1/1990 | Bollweber et al. | 73/146.5 |
| 4,895,026 | 1/1990 | Tada | 73/721 |
| 4,909,074 | 3/1990 | Gerresheim et al. | 73/146.4 |
| 4,929,851 | 5/1990 | Pace | 307/359 |
| 4,935,738 | 6/1990 | Pilato | 340/870.24 |
| 4,966,034 | 10/1990 | Bock et al. | 73/146.5 |
| 4,975,679 | 12/1990 | Ballyns | 340/442 |
| 5,001,457 | 3/1991 | Wang | 340/447 |
| 5,014,224 | 5/1991 | Hans | 338/99 |
| 5,032,845 | 7/1991 | Velasco | 342/457 |
| 5,033,295 | 7/1991 | Schmid et al. | 73/146.5 |
| 5,038,069 | 8/1991 | Lukasiewicz et al. | 73/715 |
| 5,040,562 | 8/1991 | Achterholt | 137/227 |
| 5,050,110 | 9/1991 | Rott | 364/557 |
| 5,054,315 | 10/1991 | Dosjoub | 73/146.5 |
| 5,060,527 | 10/1991 | Burgess | 73/862.68 |
| 5,079,536 | 1/1992 | Chapman | 338/99 |
| 5,090,237 | 2/1992 | Schrumpf et al. | 73/146.5 |
| 5,109,213 | 4/1992 | Williams | 340/447 |
| 5,140,851 | 8/1992 | Hettich et al. | 73/146.5 |
| 5,156,052 | 10/1992 | Johnson et al. | 73/721 |
| 5,186,054 | 2/1993 | Sekimura | 73/724 |
| 5,193,387 | 3/1993 | Hodate | 73/146.5 |
| 5,196,845 | 5/1993 | Myatt | 340/870.31 |
| 5,230,243 | 7/1993 | Reinecke | 73/146.3 |
| 5,231,872 | 8/1993 | Bowler et al. | 73/146.5 |
| 5,260,683 | 11/1993 | Tanaka et al. | 340/448 |
| 5,274,355 | 12/1993 | Galan | 340/445 |
| 5,285,189 | 2/1994 | Nowicki et al. | 340/447 |
| 5,289,160 | 2/1994 | Fiorletta | 73/146 |
| 5,296,730 | 3/1994 | Takano et al. | 73/721 |
| 5,297,424 | 3/1994 | Sackett | 73/146.5 |
| 5,301,553 | 4/1994 | Schultz et al. | 73/705 |
| 5,302,939 | 4/1994 | Downs et al. | 340/447 |
| 5,315,866 | 5/1994 | Righi | 73/146.5 |
| 5,325,720 | 7/1994 | Zuckerwat et al. | 73/715 |
| 5,349,328 | 9/1994 | Lonzame | 340/442 |
| 5,359,886 | 11/1994 | Pradelle | 73/146.2 |
| 5,438,876 | 8/1995 | Lewis | 73/721 |

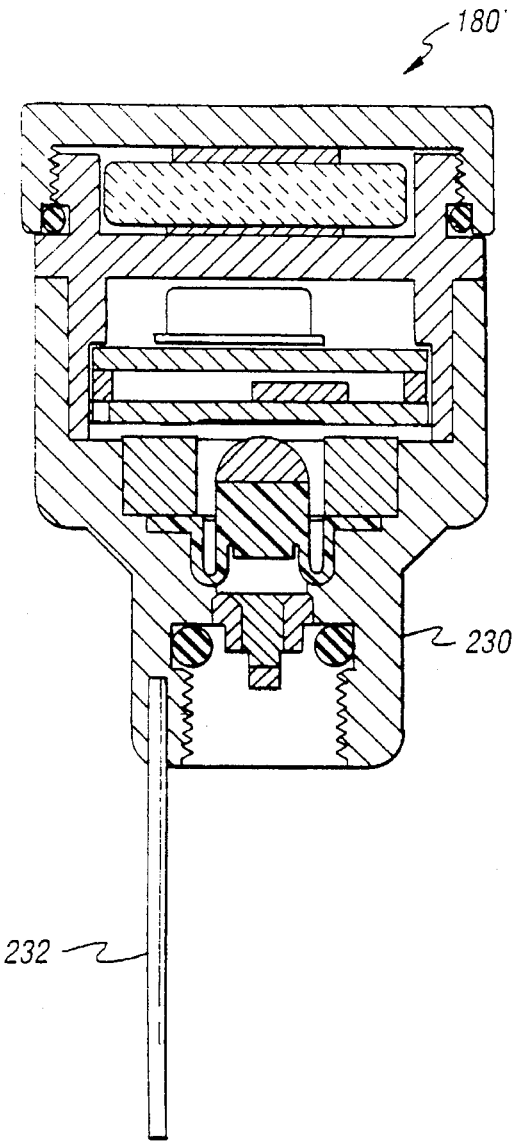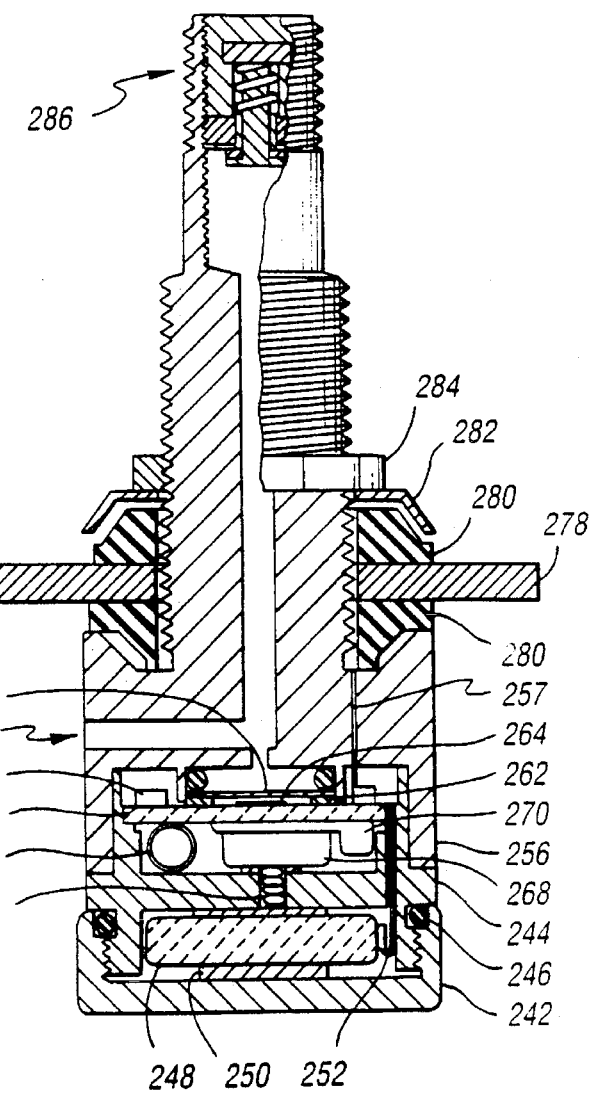
Fig. 6
Fig. 7

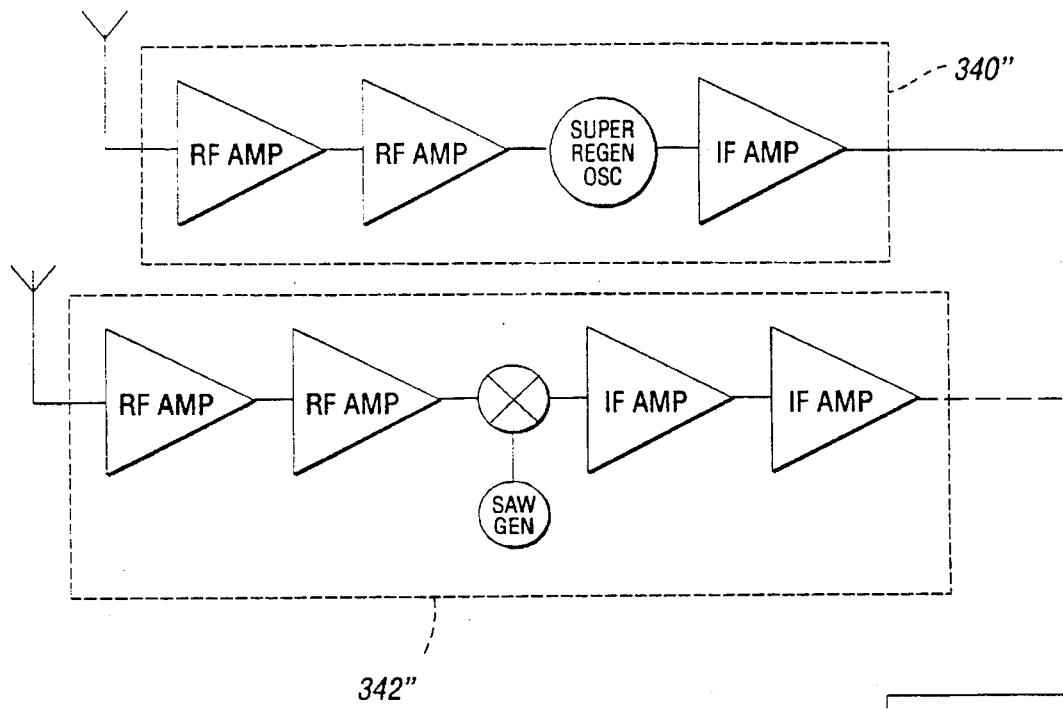
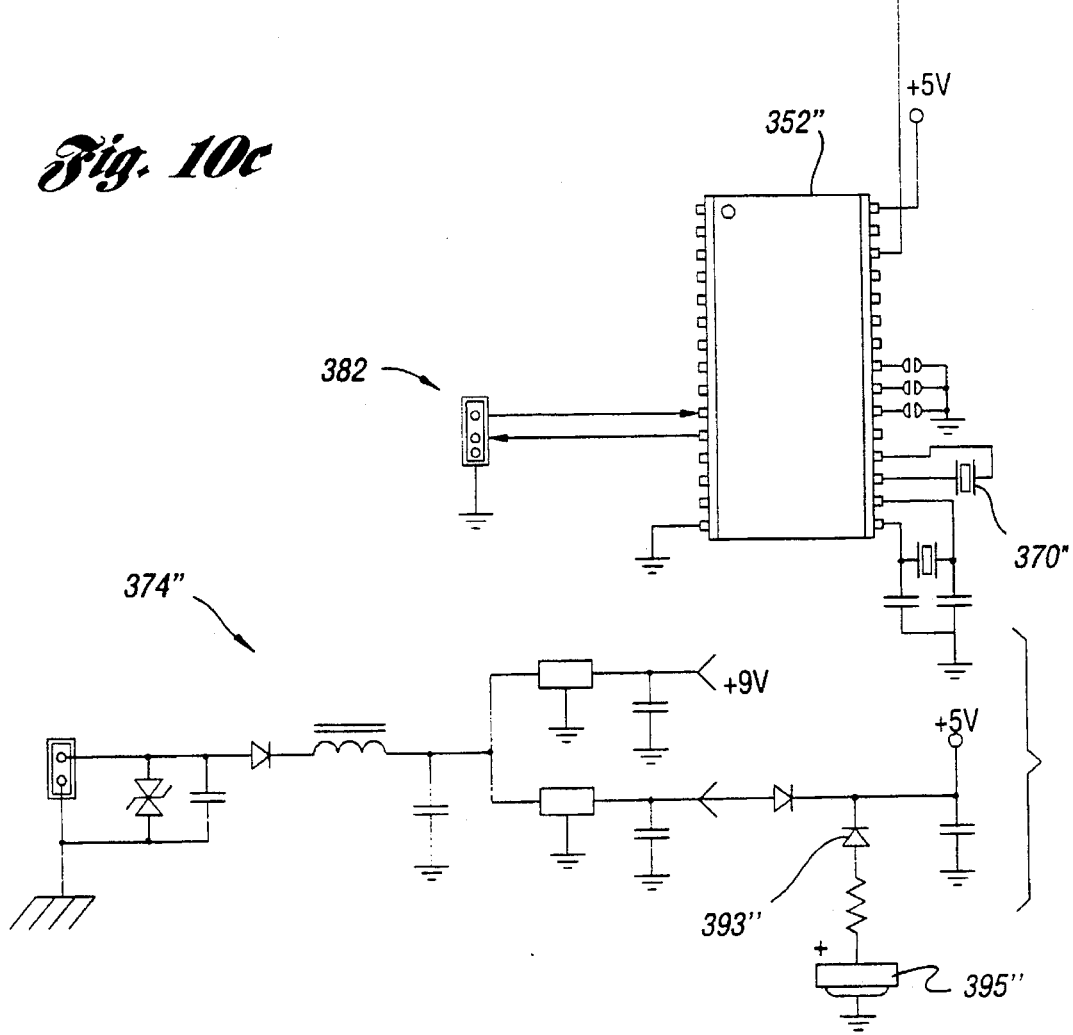
Fig. 10c

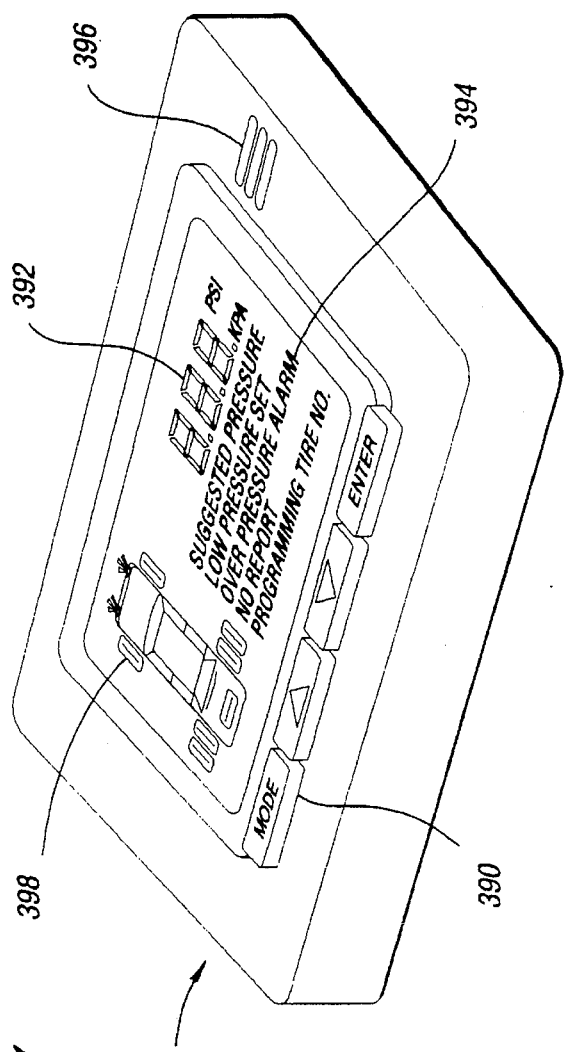
Fig. 11
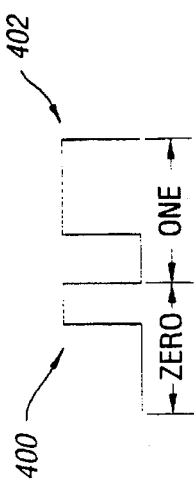
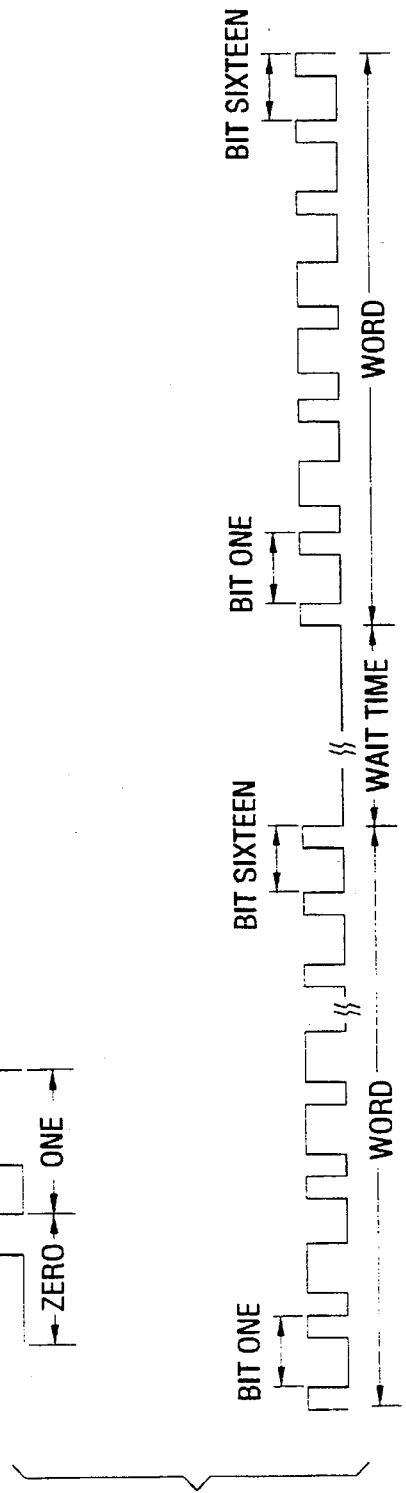
Fig. 12 (PRIOR ART)

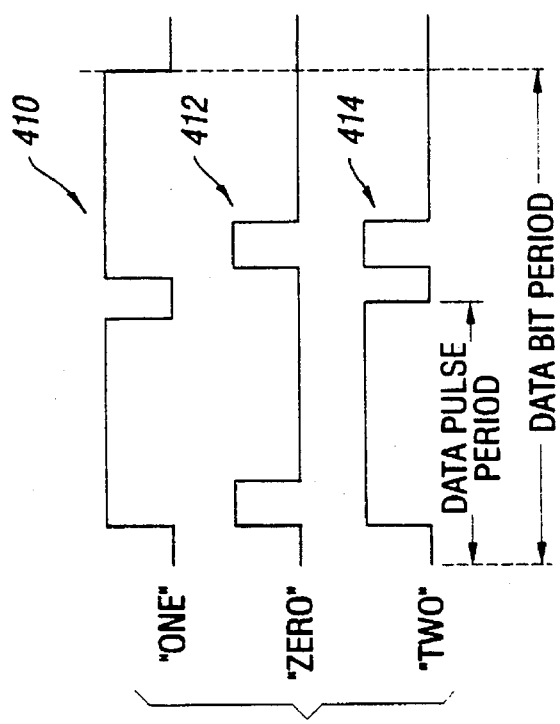
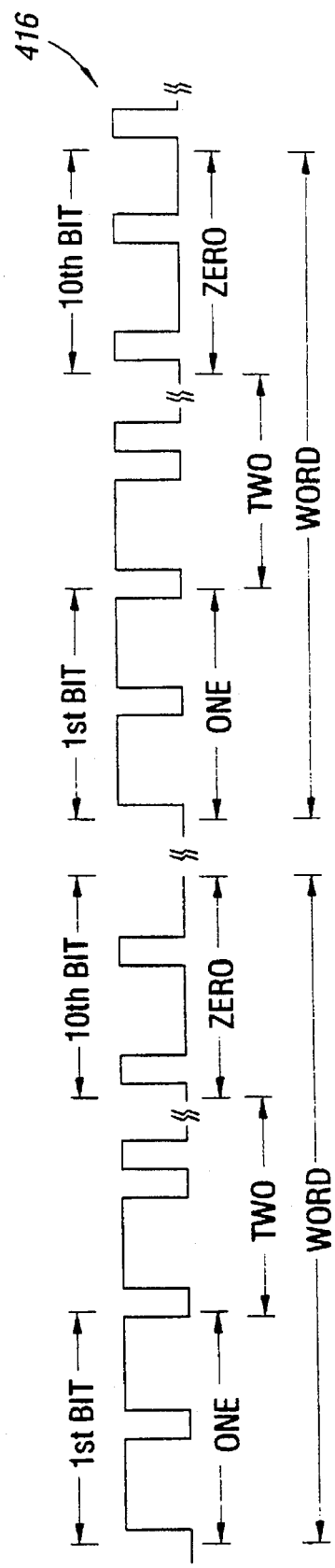
Fig. 13

PRESSURE TRANSDUCER FOR MONITORING A PNEUMATIC TIRE

This is a divisional of application Ser. No. 08/332,200 filed on Oct. 31, 1994 now abandoned.

TECHNICAL FIELD

The present invention relates to a system and method for monitoring a pneumatic tire.

BACKGROUND ART

The evolution of the microprocessor has afforded increasingly complex control systems for a number of vehicle applications. However, even the most sophisticated control system employing the fastest microprocessor available must rely on its sensors and actuators to effect control of the system. Thus, more sophisticated control systems rely on repeatable, reliable, and accurate information to execute a control strategy having those same characteristics.

As the sophistication of the vehicle control system increases, the reliance of the vehicle operator on the performance of that system increases accordingly. Thus, vehicle operators expect the vehicle control system to alert them to any operating anomalies, while compensating for those anomalies until it is convenient to have the vehicle repaired. In many of today's vehicles, the operator may be reminded that a door is ajar, the trunk is ajar, a safety belt is unfastened, the engine oil should be changed, or the headlights have been left on unintentionally, among myriad other vehicle operating conditions. Other, more serious operating anomalies, such as an anti-lock brake system failure, engine cooling system failure, or engine lubrication system failure require prompt operator attention to prevent damage to the system, or to avert a potential safety hazard to the operator. The ability of the vehicle control system to alert the operator to any of the above enumerated operating anomalies is dependent upon appropriate system sensors.

A sensor malfunction may lead to an unneeded visit to a service professional to diagnose and correct a non-existent problem. After repetitive false alarms, a vehicle operator may disregard an indication of a hazardous operating condition when one actually occurs. Similarly, a sensor which does not detect a faulty or inoperative vehicle system may lead to unnecessarily extensive repairs, or a potential safety hazard. Thus, the integrity of the system, and the resulting confidence of the operator in the system, depend upon the integrity of the sensors.

An often overlooked vehicle component which is essential to proper vehicle operation is the pneumatic tire. An improperly inflated vehicle tire may be manifested as reduced efficiency in gas mileage, reduced performance in ride and handling, reduced performance in vehicle braking, premature wearing of the tire, or a more serious flat tire or blow-out, among other potential diminutions in vehicle performance or operating safety. Tire pressure is generally measured when the tires are originally inflated or when a tire is noticeably under-inflated. Unfortunately, noticeable under-inflation is typically at an inflation pressure significantly lower than the optimal operating inflation pressure. Thus, the tire has already been operated while improperly inflated, leading to any of the number of problems noted above.

A number of prior art devices have attempted to solve the problem of improperly inflated vehicle tires by providing an automatic tire pressure monitoring system. Typically, these systems monitor tire parameters, such as temperature and pressure, and provide an indication to the vehicle operator if any of the vehicle tires are improperly inflated or a potential safety hazard exists due to severe underinflation (which may be a flat tire or a blow-out). Many of the prior art systems provide a remote sensor within each of the tires in addition to a transmitter for transmitting a signal to a centrally located receiving unit. However, each of the prior art systems has succumbed to at least one of the many varied challenges imposed upon a sensor subjected to the incredibly harsh operating environment of a vehicle tire.

A typical vehicle operating environment is not particularly amenable to the transmission and reception of digital or analog signals. Since the transmitter is often located entirely within a vehicle tire, powered by a battery separate from the vehicle battery, the receiver must be especially sensitive to the detection of relatively weak signals present in an electrically noisy milieu. Furthermore, the various electrically conductive components found on a typical vehicle may facilitate electrical communication but tend to hinder radio wave transmissions. For example, while a steel-belted tire resists penetration by sharp objects, a signal transmitted from within the tire may be severely attenuated by those very same steel belts.

Another problem associated with a transmitter disposed upon or within a vehicle tire is that rotation of a transmitting antenna induces a Doppler frequency shift in the transmitted signal if the antenna is not oriented with its center of mass along the axis of rotation of the vehicle tire. Thus, systems which utilize the valve stem of a tire as the transmitting antenna must provide complex detection circuitry to compensate for the Doppler shift. Alternatively, such systems may dramatically increase the redundancy of transmissions since much of the information will be filtered out as noise.

As with other vehicle components, a vehicle tire sensor must tolerate a wide range of temperature variations. Furthermore, a vehicle tire sensor must perform reliably under significant shock impacts and vibrations, a varying centrifugal force, and a constant applied pressure. Many of the currently available pressure sensors experience inelastic deformation of their microstructures which is manifested as a significant drift when subjected to a constant load. For example, one such sensor may drift almost 25% from its original reading when subjected to a constant load for only one (1) week.

Yet another drawback of prior art pressure sensors as applied to a vehicle tire monitoring system is the significant amount of hysteresis and nonlinear operation over their usable range. A hysteresis of up to 20% between increasing readings and decreasing readings is not uncommon. Of course, hysteresis effects and nonlinearities may be accommodated by using these sensors in conjunction with appropriate processing circuitry which typically consists of a microprocessor. Although microprocessors afford significant flexibility in programming and control functions, they consume a relatively large amount of power and generate a proportionately large amount of heat which must be dissipated. The large power consumption is undesirable for systems which are powered by a small battery.

If a sensor is externally mounted, or has an externally mounted antenna, it is subjected to even greater requirements due to exposure to the elements including water, mud, snow, ice, and the like. Thus, an externally mounted component must resist contamination by dirt and debris while also functioning reliably under conditions adverse to radio frequency (RF) transmissions. For example, an externally mounted antenna should transmit a detectable signal while immersed in water, snow, or mud, especially for commercial applications which frequently encounter such unfavorable conditions.

Another problem associated with prior art devices is in the packaging of the tire sensing apparatus. Those systems employing complex circuitry which may include a microprocessor typically require a large battery to provide sufficient power. For those systems which utilize tire sensing apparatus disposed entirely within the vehicle tires, the impact of the added weight and complexity of the system on vehicle efficiency, performance, and maintenance is critically assessed. Even a device having a relatively insignificant mass requires a counter-weight for acceptable performance at typical tire rotational speeds. The size and weight of some prior art devices makes them impractical for many vehicle applications, such as automotive applications.

Since the energy storage density of commonly available electrochemical storage devices does not facilitate prolonged periods of power consumption, the maintenance costs associated with battery replacement makes many prior art systems unduly expensive or impractical. If the transmitting unit, including the battery, is entirely disposed within the vehicle tire, battery replacement requires dismounting of the vehicle tire from the wheel. Furthermore, dismounting of the tire is also required to reprogram the monitoring device to recognize a different tire location, such as when tires are rotated. Dismounting may also be required to determine if the monitoring device is operating correctly. The inconvenience and increased cost associated with such a device often outweighs the benefits associated with proper inflation of the vehicle tires.

To increase battery life, some prior art devices transmit a signal only when improper inflation is detected. Other devices use the centrifugal force created by rotation of the tire to activate the tire monitoring device. These types of systems allow a window of opportunity for undetected damaging operation to occur. For example, a centrifugally-actuated system would not alert an operator to a flat tire until the vehicle reached a predetermined operating speed. This may result in additional damage to the flat tire. A system which only detects a flat tire would allow operation of an improperly inflated tire which was not yet flat but which could lead to premature tire wear requiring replacement.

To detect the relatively weak signals generated by a typical tire monitoring device, some prior art systems transmit a digital code representing at least one parameter of the tire. For example, U.S. Pat. No. 5,231,872 to Bowler et al. transmits a code representing an instantaneous signal value which includes an identification code and a plurality of receiver resynchronization codes for resynchronizing the central receiving unit. Such systems are unnecessarily complex and result in higher manufacturing, assembly, and maintenance costs. Furthermore, transmission of an instantaneous signal may lead to false alarms since tire inflation pressure may vary significantly during normal operation. For example, tire inflation may vary up to 7 psi between a tire exposed to direct sunlight and a tire on the same axle which is in the shade.

DISCLOSURE OF THE INVENTION

It is therefore an object of the present invention to provide a pneumatic tire monitoring system which includes a reliable, repeatable, and accurate tire pressure sensor which may be disposed within the tires of a vehicle.

Another object of the present invention is to provide a pressure sensor for use in a pneumatic tire monitoring system which does not experience significant drift when subjected to a constant load.

A further object of the present invention is to provide a pneumatic tire monitoring system which includes a reliable communication link between a number of vehicle tire sensors and a centrally located receiving unit which functions properly when subjected to adverse conditions.

Another object of the present invention is to provide a pneumatic tire monitoring system which utilizes a wheel rim as an antenna to communicate between a centrally located processing unit and remotely located vehicle tire sensing units.

An additional object of the present invention is to provide a pneumatic tire monitoring system which tolerates vibrations, shock impacts, and various other disturbances incurred over the useful life of a vehicle.

Still another object of the present invention is to provide an ultra-low-power, efficient transmitter for use in a pneumatic tire monitoring system so as to significantly extend the useful battery life.

A further object of the present invention is to provide a pneumatic tire monitoring system which includes a multi-purpose processing unit which communicates with various other vehicle systems and subsystems.

Yet another object of the present invention is to provide a communication protocol for use with a pneumatic tire monitoring system which may be easily detected in the presence of electromagnetic noise and competing signal transmissions.

A still further object of the present invention is to provide a pneumatic tire monitoring system which includes aesthetically pleasing, externally mounted tire sensing apparatus.

An additional object of the present invention is to provide a pneumatic tire monitoring system which provides an accurate indication of average tire pressure so as to minimize concern of a vehicle operator to normal variations in tire inflation pressure.

In carrying out the above objects in addition to other unenumerated objects, the present invention provides a method for monitoring a parameter of a vehicle tire. The method comprises generating a signal responsive to a parameter of the tire and conditioning the generated signal for transmission from the conductive wheel. The method further comprises transmitting the conditioned signal via the conductive wheel so as to reduce a frequency shift induced by rotation of the wheel, receiving the transmitted signal, and monitoring the tire parameter by monitoring the received signal.

In further carrying out the above objects and additional unenumerated objects, the present invention provides a system for implementing the method for monitoring a parameter of a tire mounted on a conductive wheel. The system comprises a sensor for sensing a tire parameter and generating a signal indicative thereof, a transmitter in electrical communication with the sensor, a generally circular antenna which rotates with the tire, the antenna being in electrical communication with the transmitter for transmitting the generated signal, and a receiver for receiving the transmitted signal and monitoring the tire parameter by monitoring the received signal.

The above objects and other objects, features, and advantages of the present invention will be readily appreciated by one of ordinary skill in the art from the following detailed

BRIEF DESCRIPTION OF THE DRAWINGS

FIG. 6 is a sectional view of another alternative embodiment of an externally mounted transponder for use with a pneumatic tire monitoring system according to the present invention;

FIG. 7 is a sectional view of an internally mounted transponder for use with a pneumatic tire monitoring system according to the present invention;

FIGS. 10a–10c are pictorial/schematic representations of alternative embodiments of a receiving unit for use in a pneumatic tire monitoring system according to the present invention;

FIG. 11 illustrates an alternative display unit for use with the receiving units of FIGS. 10a–10c according to the present invention;

FIG. 12 illustrates a prior art binary signaling strategy;

FIG. 13 illustrates a trinary signaling strategy for use with a pneumatic tire monitoring system according to the present invention;

BEST MODE(S) FOR CARRYING OUT THE INVENTION

Figure 1:
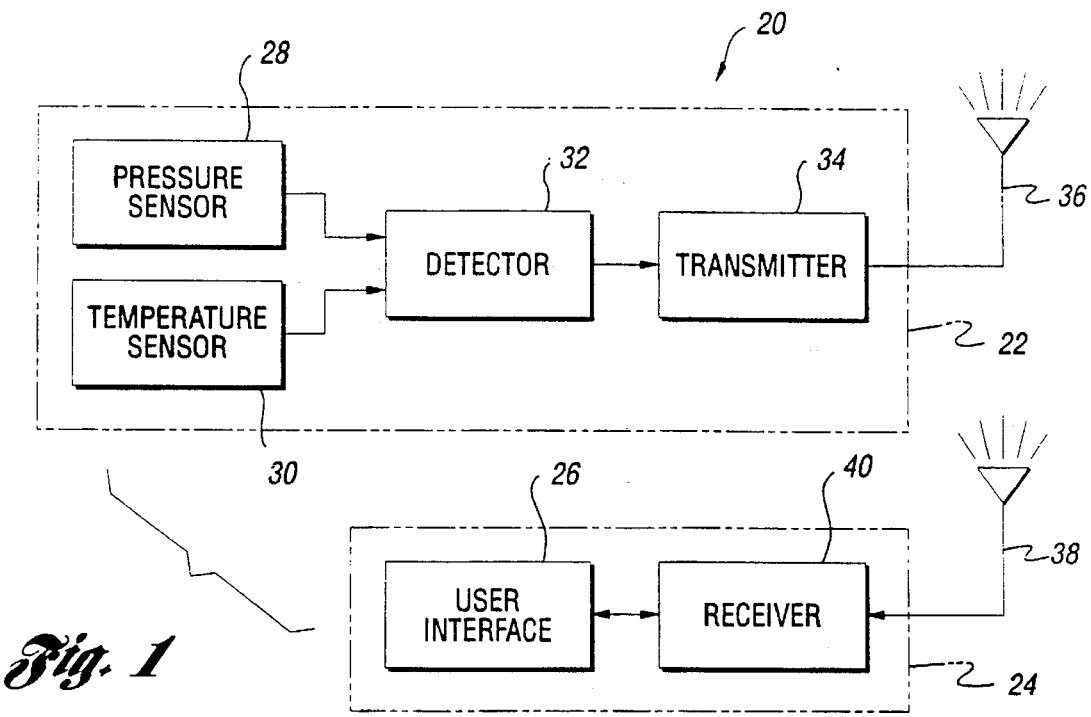
FIG. 1 presents a block diagram representation of one embodiment of a pneumatic tire monitoring system according to the present invention.

Referring now to FIG. 1, a block diagram of a pneumatic tire monitoring system, indicated generally by reference numeral 20 is illustrated. The system includes a transponder 22 and a receiving unit 24. Preferably, a complete system includes one transponder 22 for each vehicle tire. In one embodiment, transponder 22 is entirely disposed within a vehicle tire (not shown). In an alternative embodiment, transponder 22 is mounted externally on the valve stem of a vehicle tire, as explained in greater detail below. Preferably, receiving unit 24 is centrally located relative to all the transponders 22 for best reception of transmitted signals while also being located for convenient communication with an operator via user interface 26.

With continuing reference to FIG. 1, preferably, transponder 22 includes a pressure sensor 28 and may include various other sensors such as a temperature sensor 30. The sensors generate signals responsive to the current operating conditions of associated vehicle tires. The signals are communicated to separate detectors (not shown) or to an integrated detector 32. Integrated detector 32 processes the sensor signals which may include comparing the signals to various threshold levels as explained in greater detail below. Detector 32 communicates with transmitter 34 which conditions the signals generated by the sensors for transmission, and broadcasts a signal representative of at least one of the vehicle tire parameters being monitored via antenna 36.

To avoid inducing a Doppler frequency shift to the transmitted signal, antenna 36, which rotates with the vehicle tire, should be oriented so that its center of mass lies along the axis of rotation of the vehicle wheel. Preferably, antenna 36 is the vehicle wheel itself. As such, transmitter 34 conditions the signals generated by the sensors for transmission from the vehicle wheel as explained in greater detail below. The broadcast signal is received by a stationary antenna 38 which is in communication with receiver 40 of receiving unit 24. Receiver 40 processes the received signal and exchanges information with an operator via user interface 26. In a preferred embodiment, user interface 26 comprises an LCD display unit (such as the display unit illustrated in FIG. 11) for displaying the sensed tire pressure, a tire status indicator, or both to the user. Receiving unit 24 is a multiple purpose device which may communicate with various other vehicle systems and subsystems and display additional information to a vehicle operator via user interface 26, as explained in greater detail below.

Referring now to FIGS. 2a–2d, a number of pressure sensors for use with a pneumatic tire monitoring system according to the present invention are shown. It will be appreciated by one of ordinary skill in this art, and other related arts, that the pressure sensor illustrated may be used in myriad other applications which require a repeatable, precise, and accurate indication of pressure (load or force). The pressure sensor of FIGS. 2a and 2b, indicated generally by reference numeral 50, includes a conductive layer 52 deposited on a base layer 54. Preferably, conductive layer 52 has a hemispherical shape to provide a more linear response across the range of interest as explained in greater detail below.

To overcome the problems associated with many of the prior art pressure sensors, conductive layer 52 is deposited onto base layer 54 utilizing a screening process or a vacuum deposition process which are well known in the art. Preferably, base layer 54 is formed from pure silicone rubber. Also preferably, conductive layer 52 comprises approximately 20% activated N-type semiconductor material, 40% molybdenum disulfide ($MoS_2$), and approximately 40% alkyd or silicone binder. Conductive layer 52 should have a minimum of 10% of activated N-type semiconductor material, although preferably, a range of 15% to 20% will be used to provide better stability. Once the concentration of the activated N-type semiconductor material is selected, the remaining two components comprise approximately equal contributions to the composition.

Many prior art pressure sensors utilize a carbon foam composition. This requires a relatively large current draw which reduces battery life and also produces a noisy pressure signal. Furthermore, the foam type pressure sensors are subject to inelastic deformation which results in a significant drift. Other prior art sensors incorporate moving components which are adversely affected by the vibrations of the vehicle tire during normal operation. Pressure sensor 50 of the present invention provides a solid state device which is immune to vibrational degradation. The composition of the conductive layer provides superb stability and repeatability since it is not subject to inelastic deformation and the resulting drift. Furthermore, the signal provided is relatively low-noise and requires substantially less current to operate compared to prior art devices.

A number of possible compositions may be utilized to achieve the desired results. These compositions utilize similar resistive materials utilized in the manufacture of semiconductor integrated circuits. Many of these materials may be adapted for use in a pressure sensor constructed in accordance with the present invention to provide the operating characteristics described above. Some example compositions include: 40% bismuth oxide, 10% activated N-type semiconductor, and 50% alkyd binder; 35% vanadium, 15% activated N-type semiconductor, and 50% alkyd binder; 60% indium-tin, 15% activated N-type semiconductor, and 25% alkyd binder; 50% titanium, 15% N-type semiconductor, and 35% alkyd binder.

Figures 2A, 2C:
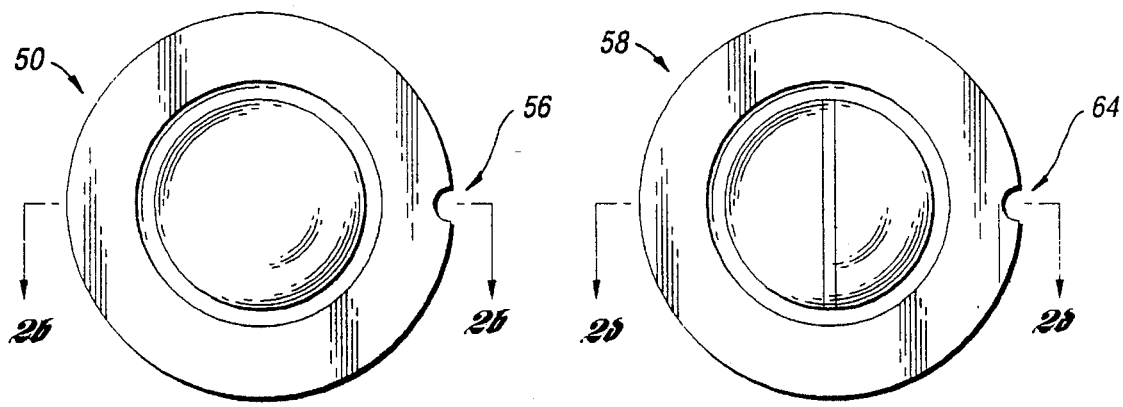
FIGS. 2a–2h illustrate a pressure sensor for use with a pneumatic tire monitoring system according to the present invention.

As also illustrated in FIG. 2a, pressure sensor 50 includes an alignment notch 56, or the like, to aid in the assembly of pressure sensor 50 into a transponder as illustrated in FIGS. 4–7.

Figure 2B:
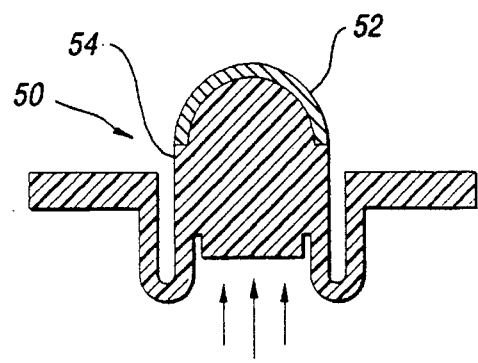
Figure 2D:
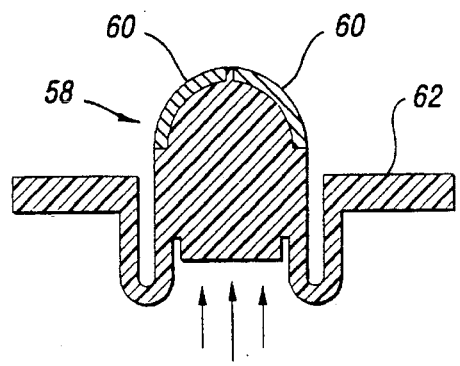
Figure 15:
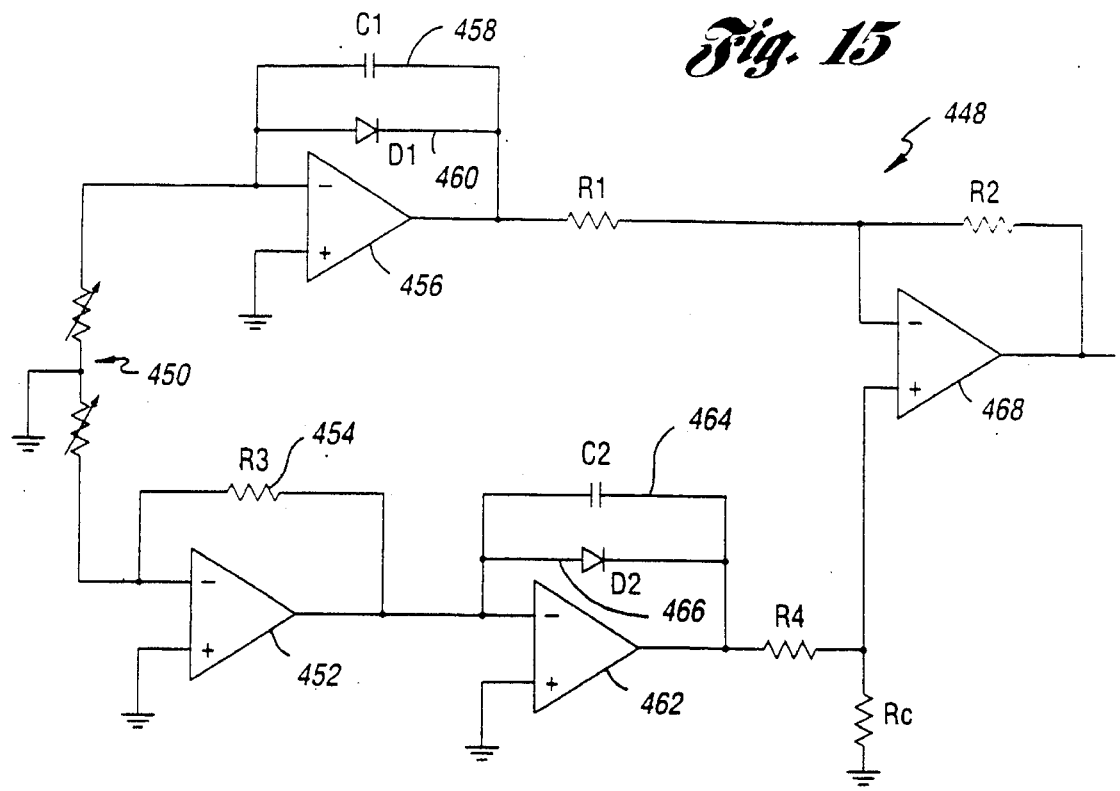
FIG. 15 is a circuit schematic for a compensation circuit for use with a pressure sensor constructed according to the present invention.

Pressure sensor 58 of FIG. 2d is utilized in conjunction with processing circuitry illustrated in FIG. 15 to provide a more linear resistance-to-pressure characteristic. Representative response characteristics for various sensors constructed according to the present invention are illustrated in FIGS. 3a–3d and explained in greater detail below. Pressure sensor 58 includes two conductive layers 60, each having a quarter-spherical shape separated by a portion of the base layer 62 extending therebetween. Preferably, conductive layers 60 and base layer 62 are formed with similar techniques and compositions as conductive layer 52 and base layer 54, respectively, described above. An alignment notch 64 is provided to aid in the assembly of pressure sensor 58 into a transponder.

Figure 2E:
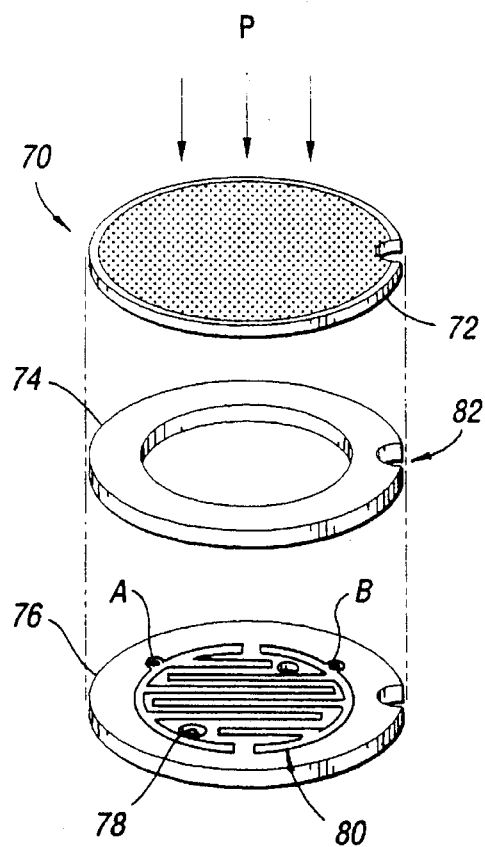
Figure 2G:
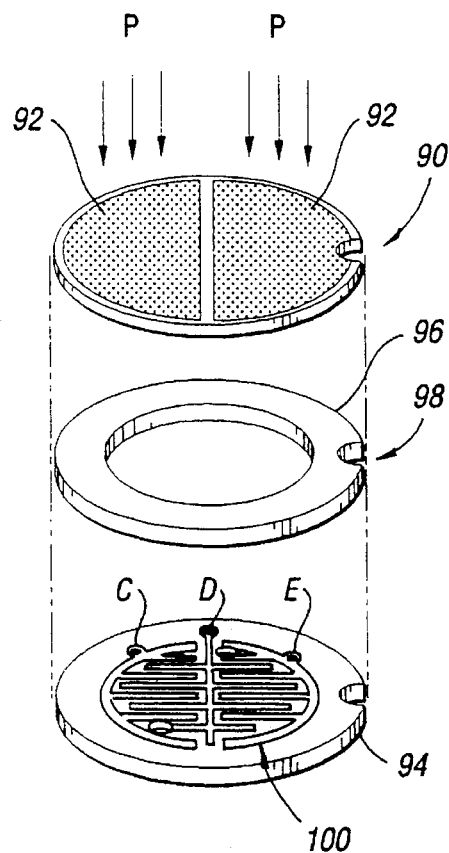
Figure 2F:
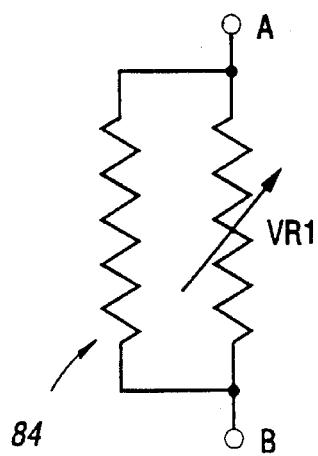

Alternative embodiments of a pressure sensor for use with a pneumatic tire monitoring system according to the present invention are shown in FIGS. 2e and 2g. A disk-type pressure sensor 70 includes a conductive layer 72 which has a composition similar to the conductive layer described for the sensors of FIGS. 2a and 2b. Conductive layer 72 is separated from a fiberglass/ceramic base 76 by a Mylar spacer 74. Base 76 includes thermal vents 78 and a conductive grid 80 comprised of two sections in electrical communication with terminals A and B, respectively. Conductive layer 72, Mylar spacer 74, and base 76 include an alignment notch 82, or the like, to aid in alignment during manufacturing and assembly. Pressure sensor 70 further includes a laser-trimmable resistor 84 (shown schematically in FIG. 2f) placed across terminals A and B to accommodate manufacturing variances in the conductive layer 72 so as to precisely calibrate the resistance of pressure sensor 70. Preferably, conductive layer 72, as with conductive layers 52 and 60 of FIGS. 2a and 2b, respectively, is deposited using a vacuum plasma deposition process. However, a silk screening process could also be used but produces less uniform results. Also preferably, conductive grid 80 is composed of a high conductivity material such as silver, carbon, copper, or the like.

Figure 2H:
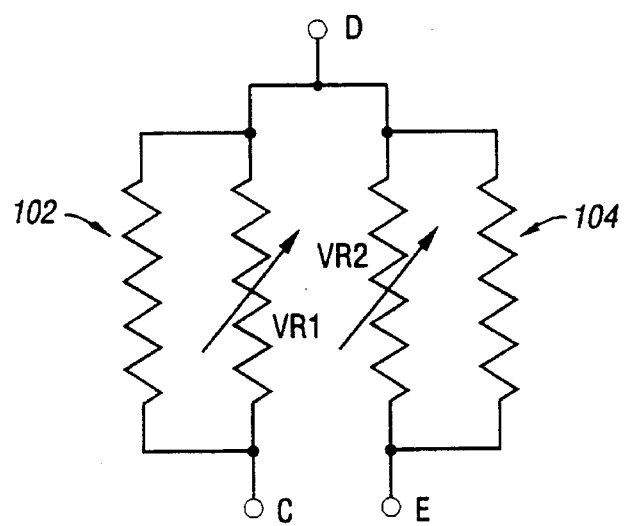

A dual-disk pressure sensor 90 is illustrated in FIG. 2d. Sensor 90 includes two semi-circular conductive layers 92 separated by a non-conductive portion therebetween. As with the pressure sensor of FIGS. 2c and 2d, sensor 90 may be utilized in conjunction with processing circuitry as illustrated in FIG. 2i to provide a more linear pressure-resistance response characteristic as described in greater detail below. Conductive layer 92 is separated from base layer 94 via Mylar spacer 96. Conductive layer 92, base layer 94, and Mylar spacer 96 include an alignment notch 98 to aid in alignment during manufacturing and assembly. Base layer 94 includes a conductive grid, indicated generally by reference numeral 100, comprising three conductive portions corresponding to terminals C, D, and E, respectively. Pressure sensor 90 also includes laser-trimmable resistors 102 and 104 (shown schematically in FIG. 2h) which are placed across terminals C and D, and D and E, respectively. Laser-trimmable resistors 102 and 104 accommodate manufacturing variances in the conductive layers 92 to allow precise calibration of pressure sensor 90.

In operation, the sensors illustrated in FIGS. 2a and 2b are used in conjunction with a base plate having a conductive grid (such as base 76 and base 94, respectively, of FIGS. 2e and 2g). Conductive layers 52 and 60 are in contact with their respective conductive grids. As air pressure exerts a force in the direction of arrows P on base layers 54 and 62, the elastic conductive layers 52 and 60 are forced against their corresponding conductive grids such that the surface area of conductive layers 52 and 60 in contact with the conductive grids increases with the force exerted by pressure P. Thus, as the pressure increases, the resistance across terminals A and B (or across terminals C and D, or across terminals D and E) decreases yielding a resistance versus pressure characteristic as shown in FIGS. 3a–3d. The sensor resistance is determined in the transponder unit by providing a fixed capacitor and driving the conductive grid with a periodic signal. The time constant for the circuit varies proportionally to the resistance of the sensor. Thus, the sensor resistance can be precisely determined by measuring the period of the output signal.

The sensors illustrated in FIGS. 2e and 2g operate in a similar fashion. A force exerted by the air pressure, indicated generally by arrows P, deforms conductive layers 72 and 92 such that they contact conductive grids 80 and 100, respectively. As pressure P increases, more surface area of conductive layers 72 and 92 contacts conductor grids 80 and 100, respectively. The properties of the materials in the conductive layer exhibit a decreasing resistance (increasing conductivity) as they are compressed, such that the resistance across terminals A and B, or terminals C and D, and terminals D and E, decreases accordingly. Thus, sensors 50, 58, 70 and 90 provide a variable resistance as a function of pressure as illustrated schematically in FIGS. 2f and 2h and depicted graphically in FIGS. 3a–3d.

Figure 3A:
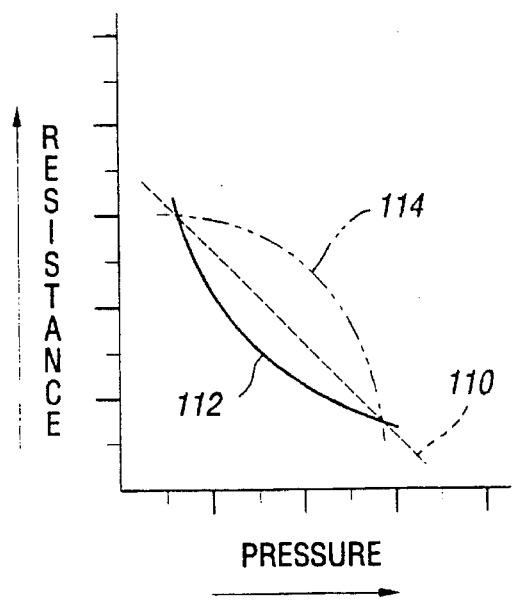
FIGS. 3a–3d illustrate the pressure-resistance characteristics of the sensors illustrated in FIGS. 2a–2d.
Figure 3B:
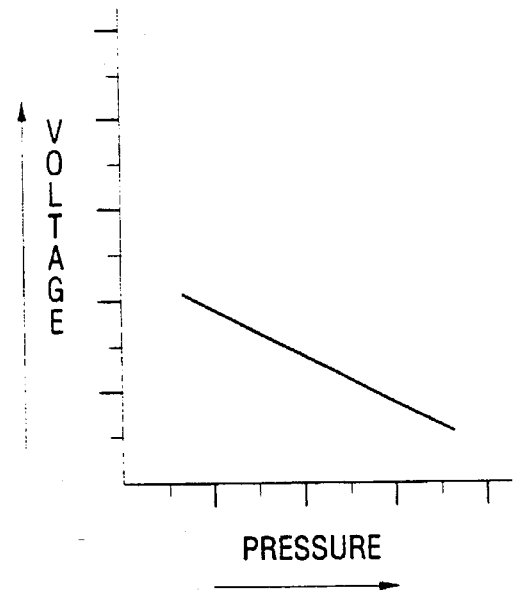

Referring now to FIGS. 3a–3d, the various operating characteristics of the sensors illustrated in FIGS. 2a–2d are graphically illustrated. Line 110 of FIG. 3a represents an ideal resistance-to-pressure response which is linear across the entire range of interest. Line 112 represents the change in resistance of a pressure sensor in response to an increase in applied pressure. Line 114 represents the output of a compensation circuit, illustrated in FIG. 15, which compensates the resistance-pressure characteristic to more closely resemble an ideal linear response.

Referring now to FIG. 15, a sine/cosine (or log/antilog) circuit is indicated generally by reference numeral 448. As illustrated, dual pressure sensor 450 is connected with a common ground. Operational amplifier 452 and resistor 454 invert their input signal produced by one of the variable resistance conductive layers of pressure sensor 450. Operational amplifier 456 is connected with capacitor 458 in parallel with diode 460 providing feedback. Diodes 460 and 466 are log diodes. The input signals to the circuit are provided by current flowing through the feedback paths, i.e. the leakage current of log diodes 460 and 466. The input signal produced by pressure sensor 450 is exponential in character as illustrated in FIGS. 3a–3d. Capacitor 458 and log diode 460 in the feedback path of amplifier 456 produce an output which is generally logarithmic in character. Thus, the output of amplifier 456 is linear across the range of interest.

With continuing reference to FIG. 15, amplifier 462 together with log diode 466 and capacitor 464 function in a manner similar to amplifier 456. The outputs of amplifiers 462 and 456 provide the input to a difference amplifier 468 which helps to reduce or eliminate any hysteresis inherent in the pressure sensor 450. Thus, the output of compensation circuit 448, which is the output of amplifier 468, is much closer to an ideal linear response without hysteresis as desired.

Figure 3C:
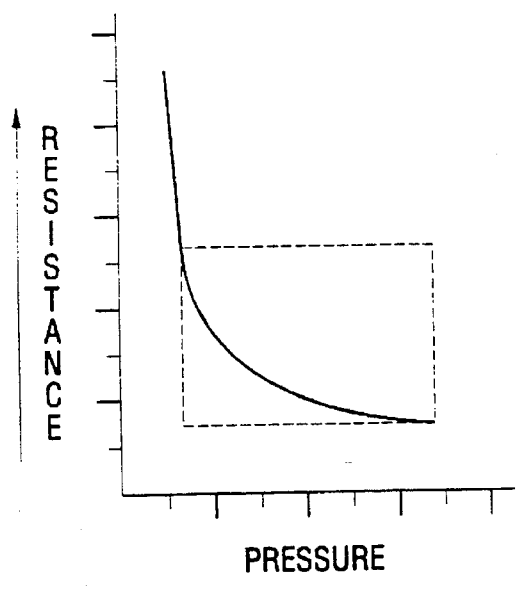

The response characteristic illustrated in FIG. 3c corresponds to a single disk pressure sensor, such as sensor 70 of FIG. 2e. Since conductive layer 72 of pressure sensor 70 is relatively flat, the resistance versus pressure characteristic is somewhat more non-linear than that produced by the hemispherical conductive layer utilized for sensors 50 and 58. However, a flat conductive layer such as conductive layer 72 or conductive layer 92, is less costly to produce.

Figure 3D:
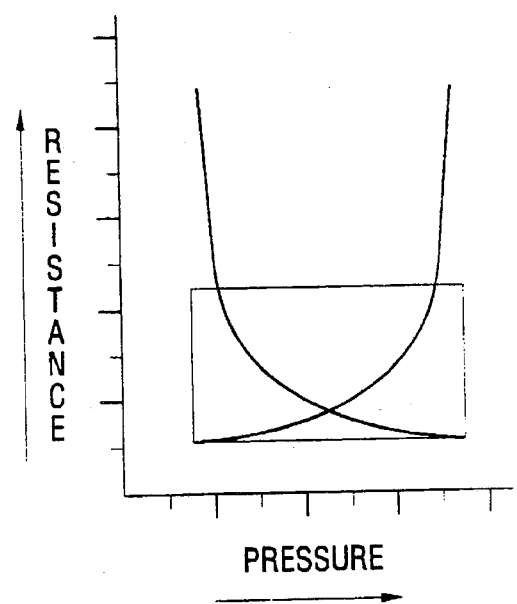

FIG. 3d illustrates complementary non-linear responses produced by a disk shaped dual pressure sensor, such as sensor 90 illustrated in FIG. 2g. An appropriate combination of these complementary responses may be utilized in conjunction with the processing circuitry described above to reduce the non-linearity of the resistance versus pressure response.

Figure 4:
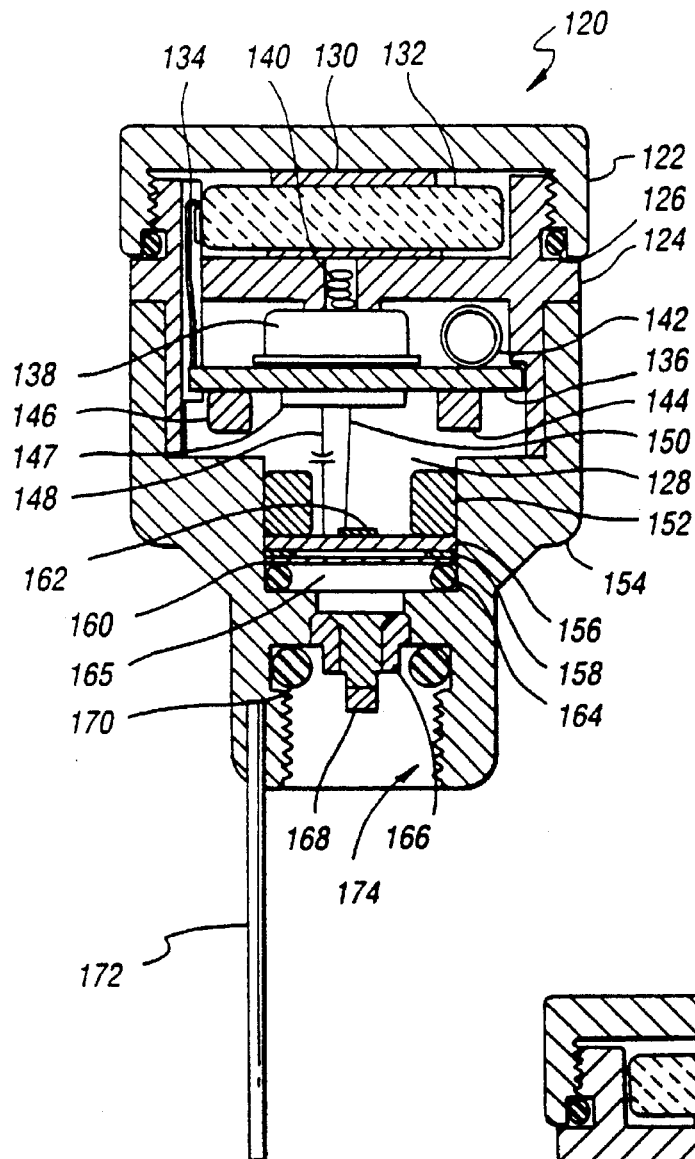
FIG. 4 is a sectional view of an externally mounted transponder for use with a pneumatic tire monitoring system according to the present invention.

Referring now to FIG. 4, one embodiment of an externally mounted transponder for use with a pneumatic tire monitoring system according to the present invention is shown. Transponder 120 includes a non-conductive cap 122 which is threadingly engaged to a non-conductive component retaining wall 124. O-ring 126 isolates interior chamber 128 from the external environment. Non-conductive cap 122 includes a non-conductive spacer 130 made of a suitable material, such as plastic, to exert a force on battery 132 for a proper electrical connection. Preferably, battery 132 is a single lithium cell which provides a nominal voltage of six (6) volts. A battery clip 134 is biased to contact a positive terminal of battery 132 to provide power to printed circuit board (PCB) 136. Ground terminal 138 is connected to the negative terminal of battery 132 via spring 140. PCB 136 also includes an inductor 142, a surface mount inductor 144, and a connector 146. The PCB 136 also contains an application-specific integrated circuit (ASIC) 147. PCB 136 is connected to pressure sensor base layer 156 via a capacitor 148 and at least one conductor 150 (depending upon the particular sensor construction being utilized). A bushing 152 is press-fit into housing 154 to retain base layer 156, Mylar spacer 158, and conductive layer 160. O-ring 164 seals the interior chamber 165 between conductive layer 160 and push-pin 168. Bushing 166 is press-fit into housing 154 and allows air to pass along push-pin 168 into interior chamber 165 when transponder 120 is threadingly engaged to a pneumatic tire valve stem (not shown).

With continuing reference to FIG. 4, O-ring 170 prevents air from escaping through the threaded portion of housing 152 when transponder 120 is coupled to a pneumatic tire valve stem. Preferably, housing 154 is made of a lightweight, electrically conductive material, such as aluminum or the like. Whisker connector 172 is press-fit into an appropriate aperture along a threaded portion 174 of housing 154 to provide electrical conductivity between housing 154 and the transponder antenna which is preferably the wheel rim. It should be appreciated that the whisker functions only as an electrical connector and does not function as an antenna. Various lengths of whisker connectors 172 may be utilized to accommodate varying sizes of valve stems associated with various sizes of pneumatic tires. Of course, whisker connector 172 could be an electrically conductive spring as illustrated in FIG. 5, or other similar electrically conductive device.

Figure 5:
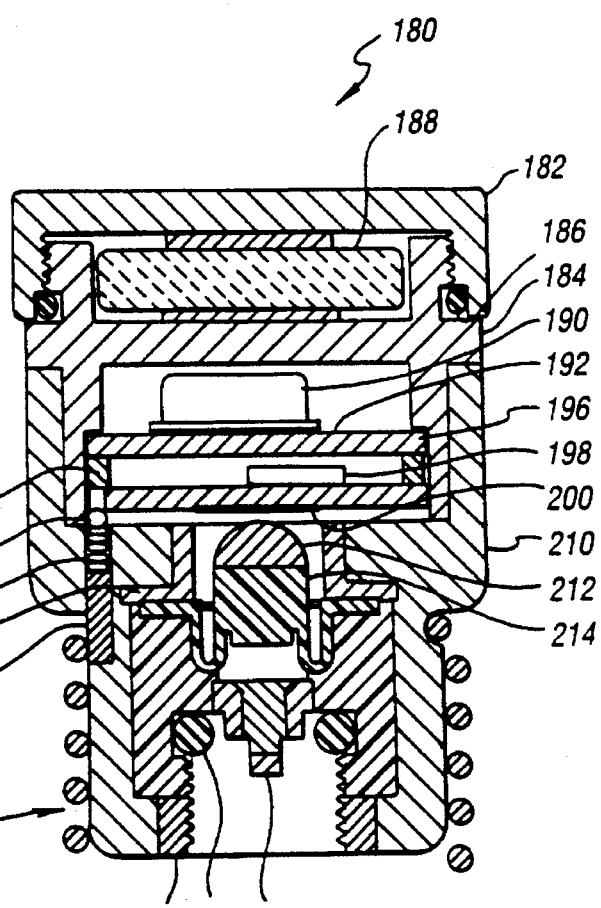
FIG. 5 is a sectional view of an alternative embodiment of an externally mounted transponder for use with a pneumatic tire monitoring system according to the present invention.

Referring now to FIG. 5, an alternative embodiment of a transponder 180 for use in a pneumatic tire monitoring system according to the present invention is shown. Similar to the embodiment illustrated in FIG. 4, a non-conductive cap 182 is threadingly engaged to a non-conductive component retainer 184 with an air-tight seal being provided by O-ring 186. Battery 188 is connected in a similar fashion as the embodiment of FIG. 4 so as to prevent improper insertion of the battery from providing a reverse polarity voltage to the system. Transponder 180 includes a ground terminal 190 electrically connected to a printed circuit board 192. PCB 192 includes an ASIC, as well as various other circuit components (not specifically illustrated). PCB 192 is separated via spacer 194 from a base layer 196 which includes a laser-trimmable resistor 198 and a conductive grid 200. An electrically conductive ball 202, spring 204, and pin 206 in conjunction with external spring 208 provide an electrical path to the transmitting/receiving antenna which is preferably the wheel rim (not shown). Preferably, housing 210 is constructed of a material which is high-strength, lightweight, and electrically insulating. Hemispherical conductive layer 212 is deposited upon base layer 214 which is preferably composed of pure silicone rubber. Bushing 216 provides a stable surface for base layer 214.

With continuing reference to FIG. 5, an insert 218 is constructed of a lightweight, durable material and is press-fit into housing 210 to increase the structural integrity of the threaded portion. O-ring 220 prevents air from escaping through the threaded portion provided by insert 218 when transponder 188 is installed on a valve stem of a pneumatic vehicle tire (not shown). Push-pin 222 is operative to engage a needle valve of a pneumatic tire (not shown) and allows pressurized air to exert a force on base layer 214.

In operation, transponder 180 is threadingly engaged with the valve stem of a pneumatic vehicle tire. Push-pin 222 depresses a needle valve (not shown) within the valve stem of the vehicle tire to allow pressurized air to exert a force on base layer 214. This force is transferred to conductive layer 212 so as to compress conductive layer 212 against conductive grid 200. This provides a variable resistance indicative of the inflation pressure of the pneumatic tire as explained in detail above.

Referring now to FIG. 6, another embodiment of an externally mounted transponder for use with a pneumatic tire monitoring system according to the present invention is shown. The alternative pressure sensor 180' utilizes a hemispherically-shaped pressure sensor similar to the embodiment illustrated in FIG. 5. However, this embodiment realizes an electrically conductive housing 230 in conjunction with a whisker connector 232 to create an electrically conductive path to the antenna (not shown). Alternative pressure sensor 180' is otherwise identical in construction and function to pressure sensor 180 illustrated in FIG. 5 and described in detail above. Additional primed reference numerals have been omitted for the sake of clarity.

Referring now to FIG. 7, an internally mounted transponder for use with a pneumatic tire monitoring system according to the present invention is shown. Transponder 240 includes a cap 242 threadingly engaged to a component-retaining member 244 and sealed from outside contaminants by O-ring 246. Cap 242 includes a spacer 250 which is electrically insulating. A battery clip 252 connects the positive terminal of the battery 248 to PCB 254. Housing 256 includes a passage 258 to allow pressurized air access to conductive layer 260. A Mylar spacer 262 separates conductive layer 260 from conductive grid 264 located on the bottom of PCB 254. Transponder 240 also includes a spring 266 to provided electrical conductivity from the negative terminal of battery 248 to ground terminal 268. PCB 254 includes an ASIC 270, an inductor 272, a laser-trimmable resistor 274, and a laser-trimmable inductor 276. Ground terminal 268 encloses a surface acoustic wave (SAW) resonator or a laser-trimmable capacitor circuit (not shown) as described in greater detail below.

With continuing reference to FIG. 7, a threaded portion of housing 256 extends through an appropriately sized aperture located in the rim of a wheel 278. Conductive rubber seals 280 provide electrical conductivity from housing 256 to wheel rim 278 which functions as the antenna. A retaining washer 282 and nut 284 engage the threaded portion of housing 256 to secure transponder 240 to wheel rim 278. A conventional needle pin and spring arrangement 286 is disposed within the end of the valve stem to allow inflation or deflation of the tire. Housing 256 and rubber seals 280 circumscribe channel 257 having a fiberoptic waveguide 259 disposed therein. Fiberoptic waveguide 259 is connected to PCB 254 to provide an additional communication path for exchanging diagnostic, maintenance, and history information, as well as allowing programming of the device as explained in greater detail below.

Figure 8:
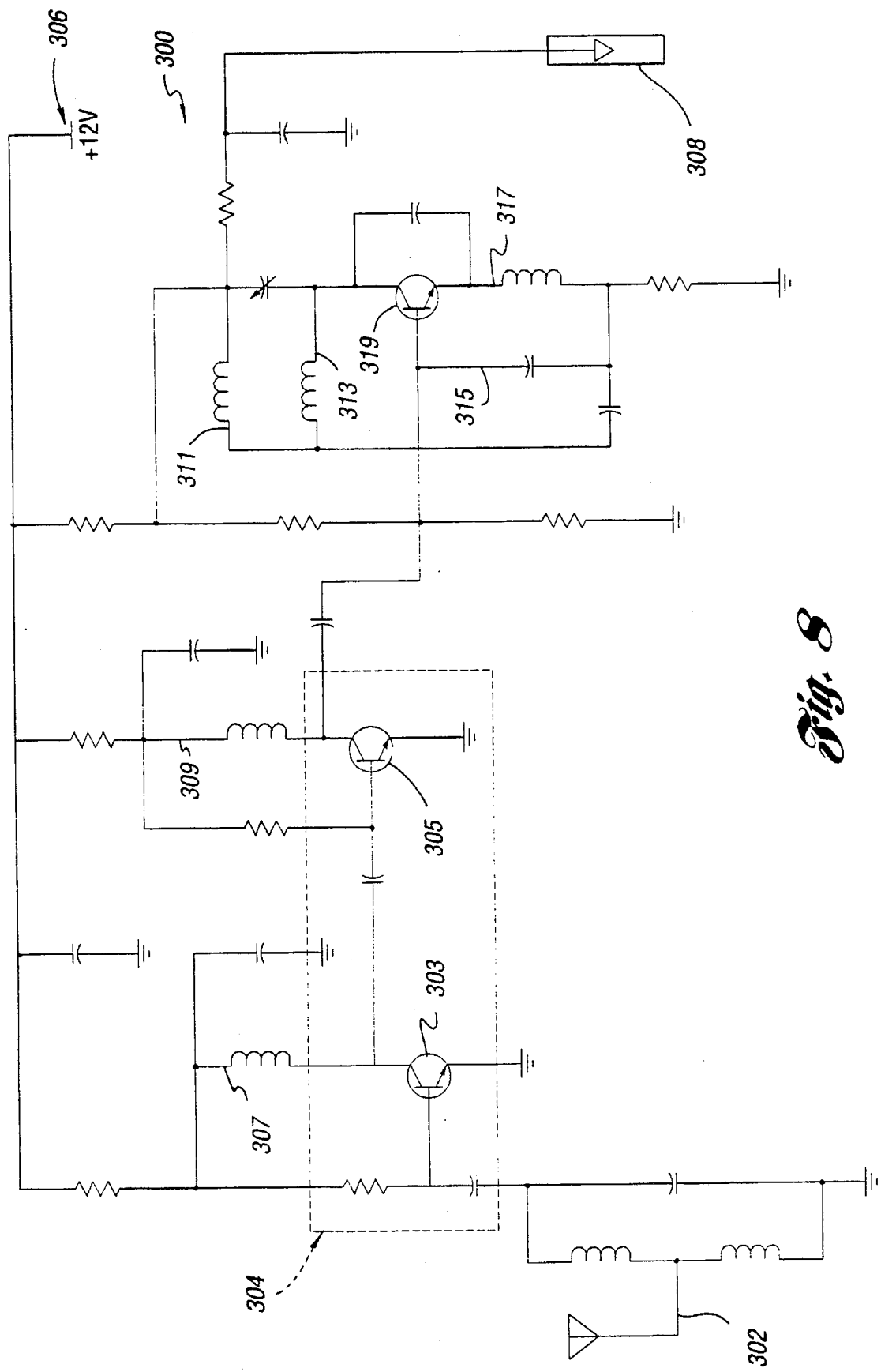
FIG. 8 is a circuit schematic illustrating components included in a super regenerative receiver for use with a pneumatic tire monitoring system according to the present invention.

Referring now to FIG. 8, a circuit schematic illustrating a receiver for use with a pneumatic tire monitoring system according to the present invention is shown. The circuit schematic illustrates the principal components utilized to implement a high sensitivity, high stability, low cost receiver. Other than those modifications noted below, the receiver implements a super-regenerative strategy with compensation. Antenna 302 receives a transmitted electromagnetic signal. The transmitted signal may originate from a transponder such as those illustrated in FIGS. 4–7, or another transmitting unit. Preferably, receiver 300 is tuned to detect pulses at a nominal frequency of 300 MHz and 90 MHz. A receive signal is amplified by a two-stage common base amplifier 304 implemented using two low-noise transistors 303 and 305. Isolating inductors 307 and 309 reduce noise associated with power supply 306. Inductors 311 and 313 are coupled out of phase to provide further stability to the system. Preferably, inductors 311 and 313 have a nominal value of 20 mH, capacitor 315 and inductor 317 are selected to tune the quenching frequency of the circuit. Preferably, the nominal quenching frequency of the circuit is 100 Khz. An additional low noise transistor 319 is provided to implement the super-regenerative detector to provide a relatively noise-free output signal at receiver output connector 308.

Figure 9:
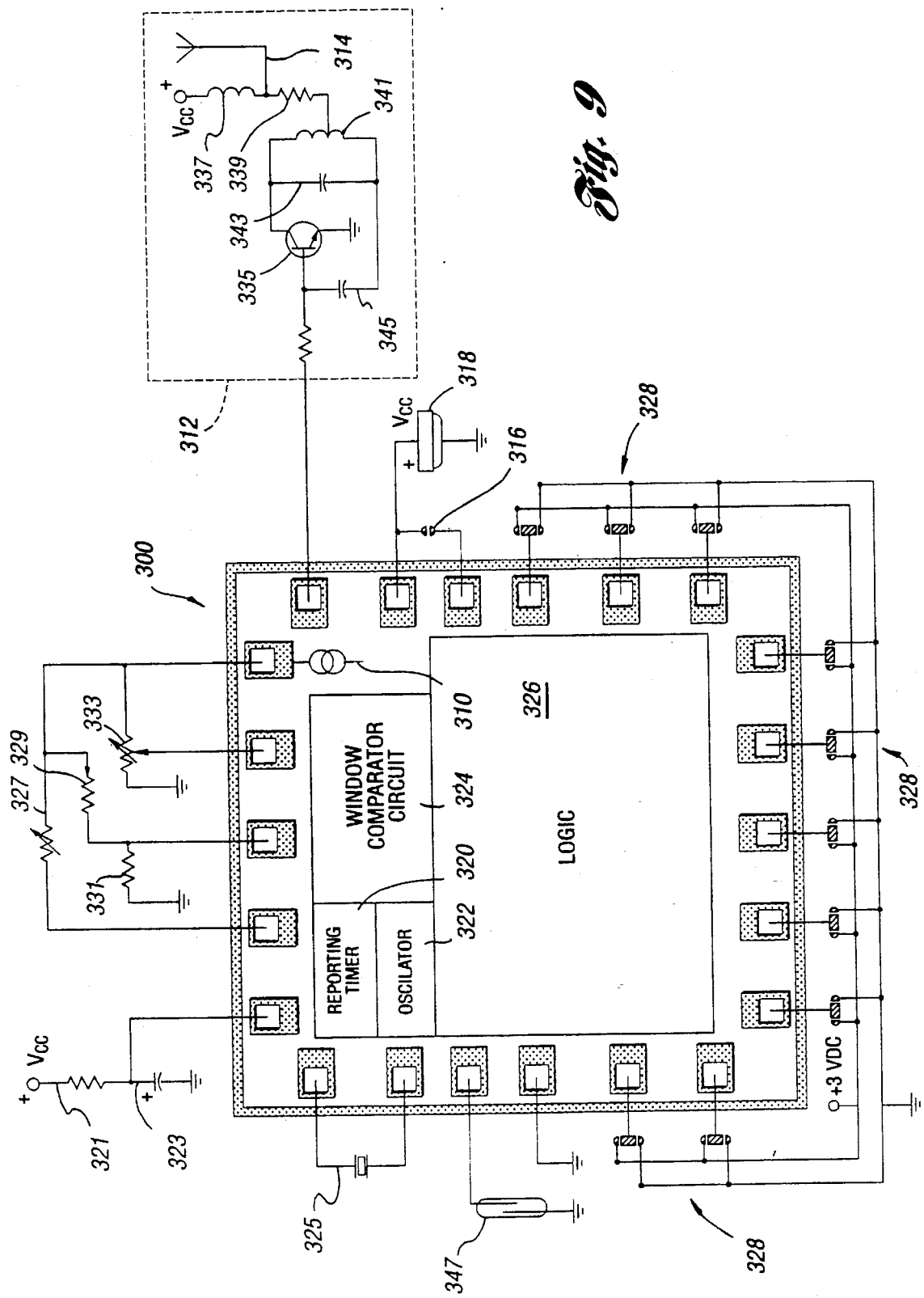
FIG. 9 is a pictorial/schematic diagram of an integrated circuit and supporting components disposed within the transponders of FIGS. 5–7 according to the present invention.

Referring now to FIG. 9, a pictorial/schematic diagram illustrating the application specific integrated circuit (ASIC) and associated circuitry utilized in the various transponders of the present invention is shown. Resistor 321 and capacitor 323 provide an RC time constant which controls reporting timer 320. When in a normal reporting mode, reporting timer 320 determines the frequency at which various information, such as battery condition and pressure sensor readings, is transmitted to a receiving unit. A crystal 325 controls the internal clock for ASIC 300 to provide date and time stamping functions. Crystal 325 also serves as an input to oscillator 322. Sensor 327 is a variable resistance pressure sensor such as those illustrated in FIGS. 2a–2d. Sensor 327 is also connected to a constant current device 310 which controls the current flowing through sensor 327. Resistors 329 and 331 provide a voltage divider input to window comparator circuit 324 to control a lower threshold for reporting pressure information, as explained in greater detail below. Variable resistor 333 is preferably a potentiometer which is user adjustable to control the upper threshold for the window comparator circuit 324. When a pneumatic tire is in its normal operating pressure range, the voltage across sensor 327 will be between the lower threshold determined by resistors 329 and 331, and the upper threshold determined by variable resistor 333. When the voltage of sensor 327 is below the lower threshold or above the upper threshold, the operating mode changes to alarm mode and reporting information is sent immediately rather than during the next interval scheduled by reporting timer 320.

Still referring to FIG. 9, the components contained within transmitting circuit 312 are located on a printed circuit board, such as PCB 254. In a typical transmission circuit, antenna 314 may be connected to the collector node of transistor 335. However, this arrangement leads to a shift in the frequency of transmission if the capacitance within the immediate area changes even slightly (due to capacitive coupling). This may occur in a number of situations such as when an operator approaches the antenna. The transmitting circuit 312 overcomes this problem by providing impedance matching using inductor 337 and resistor 339 and having antenna 314 connected therebetween. Resistor 339 is then connected to a center tap of inductor 341.

Preferably, inductor 337 has a nominal value of 1,000 Nh and resistor 339 has a nominal value of 50 Ω. Capacitor 343 is a laser-trimmable capacitor which is trimmed after manufacturing to precisely adjust the transmitting frequency of transmitting circuit 312. Capacitor 345 provides a feedback path for transistor 335 which is a low-noise NPN-type transistor.

The impedance matching provided by inductor 337 and resistor 339 improves the transmission characteristics of antenna 314 which is preferably a vehicle wheel rim. Thus, transmitting circuit 312 accommodates various sizes of wheel rims having various impedances without modification. Furthermore, the system is immune to local changes in capacitance due to capacitive coupling, such as when the vehicle wheel is in standing water or a user approaches the vehicle.

Still referring to FIG. 9, a test pin 316 is provided to connect the positive input of battery 318 to the test pin input of ASIC 300. This initiates a test sequence performed by logic 326 of ASIC 300 which transmits various diagnostic indicators including a unique unit serial number, current battery status, current pressure sensor status, current pressure sensor reading, and current time, among others. A number of three-position jumpers 328 are utilized to program the unique unit serial number during manufacturing. Each jumper input may be connected to a positive voltage (preferably 3 volts DC), ground, or left open. This provides $3^{10}$ unique serial numbers for use by various transponders so as to minimize the possibility of receiving a signal from a transponder mounted on a different vehicle. A reed relay 347 provides a serial input which is processed by logic 326 to select various programming modes. Alternatively, an optical link may be provided to accomplish this function, as explained in greater detail below.

Figure 10A:
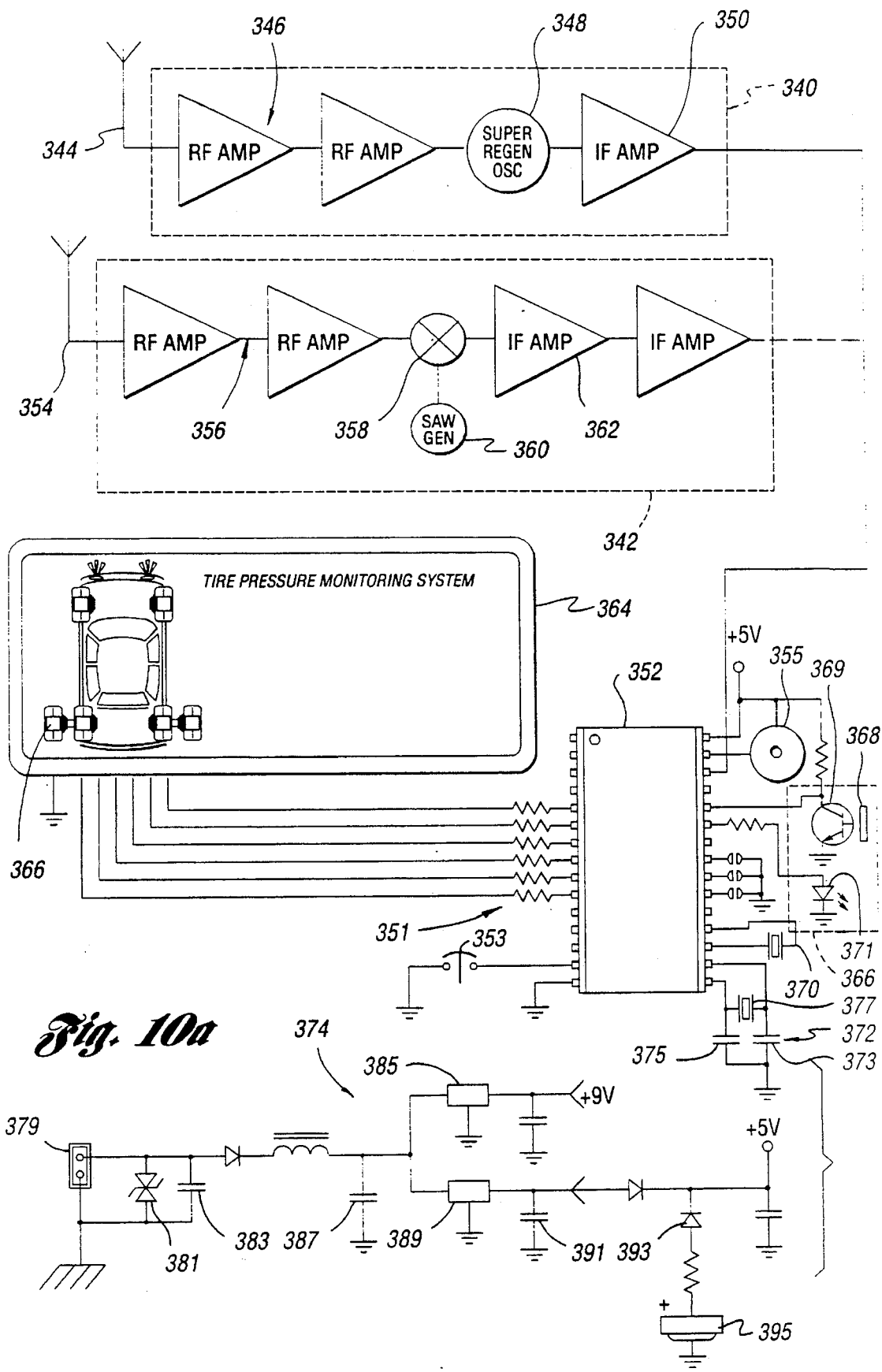
Figure 10B:
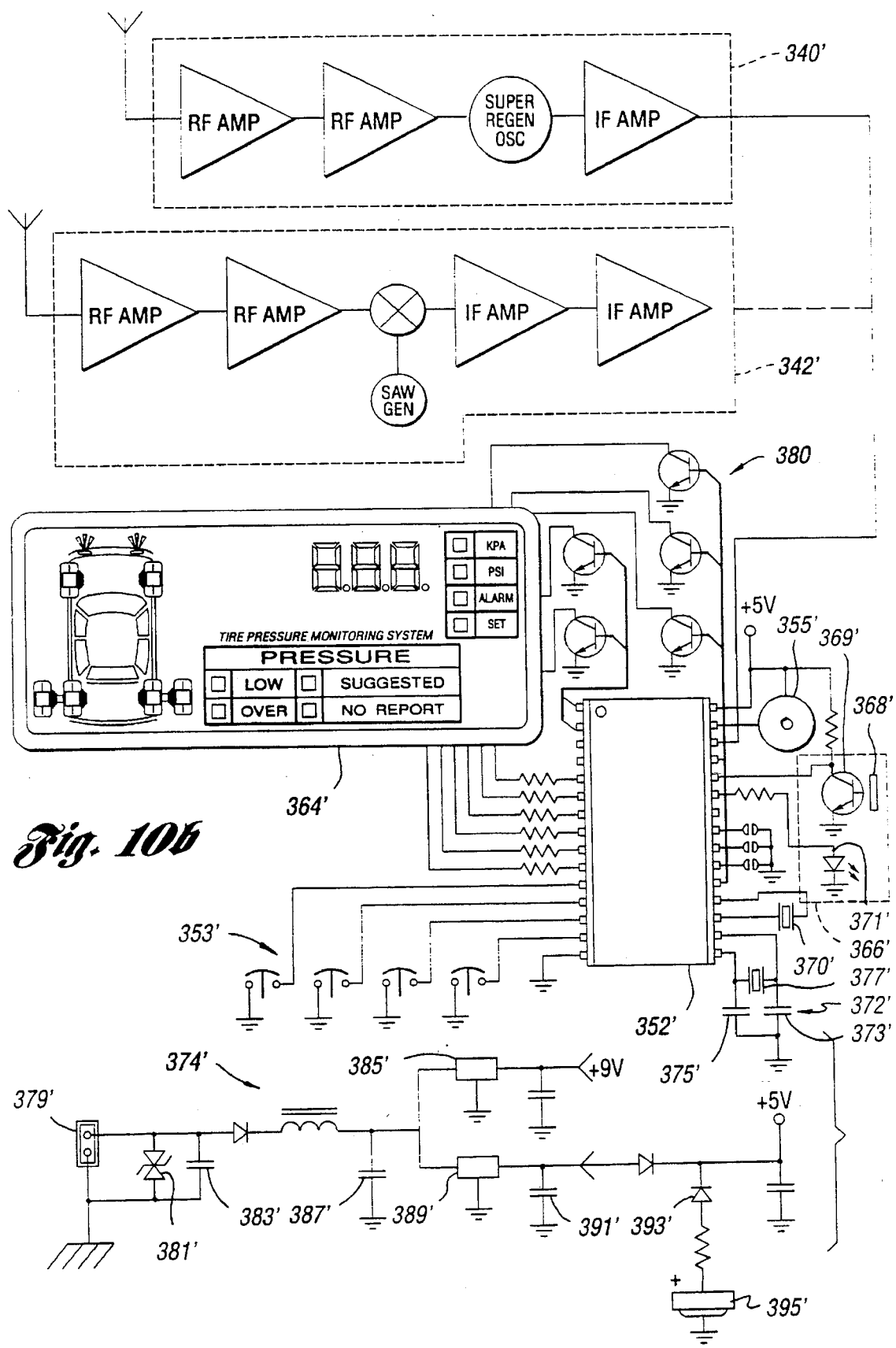

Referring now to FIGS. 10*a*–10*c,* alternative embodiments of a transponder receiver for use with a pneumatic tire monitoring system according to the present invention are shown. Components illustrated in FIGS. 10*b* and 10*c* which are similar in construction and function to components illustrated in FIG. 10*a* are indicated by primed (xx') and double-primed (xx") reference numerals. Thus, the construction and operation of those components is described with reference to the unprimed reference numerals of FIG. 10*a.*

As illustrated in FIG. 10*a,* the transponder receiver may utilize super-regenerative receiver circuitry 340 or, alternatively, superheterodyne receiver circuitry 342. The super-regenerative receiver circuitry 340 includes a receiving antenna 344 coupled to a two-stage radio frequency (RF) amplifier 346 which amplifies the received signal. Super-regenerative oscillator 348 converts the frequency of the received signal which is then amplified by intermediate frequency (IF) amplifier 350 before it is communicated to integrated circuit 352. Alternatively, superheterodyne receiver circuitry 342 may be utilized which includes an antenna 354 for receiving the transmitted signal. The received signal is then amplified by two-stage RF amplifier 356. The amplified signal is mixed by mixer 358 with a signal generated by SAW oscillator 360 to produce a signal having an intermediate frequency. This signal is then amplified by a two-stage IF amplifier 362 before it is communicated to integrated circuit 352.

With continuing reference to FIG. 10*a,* integrated circuit (IC) 352 performs a number of system functions. For example, IC 352 contains a predetermined instruction set which is executed to effect various programming and control functions of the pneumatic tire monitoring system. Random Access Memory (RAM) within IC 352 provides a data input buffer for received transmissions so that they may be recorded and stored for future processing. IC 352 also contains data discrimination circuitry which filters out spurious signals which were not transmitted by a transponder associated with the system, or which were transmitted erroneously. IC 352 also contains automatic gain control (AGC) circuitry and additional RF amplifying circuitry.

Still referring to FIG. 10*a,* an LCD display 364 provides a graphical user interface to alert the user to properly inflated and/or improperly inflated tires. LCD display 364 is coupled to IC 352 via current limiting resistors 351. LCD display 364 includes an area 366 corresponding to each of the vehicle tires. Push button 353 is utilized to select various operating modes and program the pneumatic tire monitoring system. A buzzer 355 is provided to alert the vehicle operator of an abnormal operating condition. Preferably, a silencing feature is also provided so that the buzzer does not distract the operator during an emergency situation, e.g. after a blowout. The silencer feature may be manually or automatically implemented as described in greater detail below.

As also shown in FIG. 10*a,* an optical link 366 is provided so that the system may provide information to, or receive information from, various other vehicle subsystems. Thus, the transponder receiver illustrated functions as a multipurpose receiver. Optical link 366 includes a filter 368 for filtering light passing to optical transistor 369. Preferably, filter 368 has a relatively narrow bandwidth such that only those signals having a similar bandwidth are allowed to pass through filter 368 to optical transistor 369. Optical link 366 also includes a light-emitting diode (LED) 371 for transmitting optical information. Alternatively, fiberoptic link 366 could be provided for transmitting and receiving optical information from various other vehicle systems and subsystems.

With continuing reference to FIG. 10*a,* a clock crystal 370 is provided for date stamping of alarms and maintenance information. An alarm buffer is maintained within IC 352 which contains a predetermined number of the most recently activated alarm codes for diagnostic purposes. An oscillating circuit 372 includes capacitors 373 and 375 as well as crystal 377 which provides the frequency of oscillation for the main logic of IC 352 and the data discrimination circuitry.

The power conditioning and buffering circuitry is indicated generally in FIG. 10*a* by reference numeral 374. This circuitry includes a standard fuse and magnetic overload protection (not shown) connected in series with connector 379. Element 381 provides protection against voltage transients while capacitor 383 provides impedance matching. Voltage regulator 385 and filtering capacitor 387 provide a filtered 9 volt analog power supply. Voltage regulator 389 and filtering capacitor 391 provide a separate 5 volt digital power source. Diode 393 protects the system from reverse polarity caused by an improperly installed battery 395. When properly installed, battery 395 provides efficient backup power for the system clock and RAM.

The alternative embodiment illustrated in FIG. 10*b* has components similar to those described above and illustrated in FIG. 10*a* as indicated by the primed reference numerals. Push buttons 353' provide increased flexibility and selection of modes and features of the system. Display unit 364' includes a graphical display section as well as a numerical display section. Of course, display 364' could be integrated into other similar displays typically found on the instrument panel of a vehicle. Likewise, other vehicle information could be transmitted to IC 352' via optical link 366' and displayed on display unit 364'. For example, a compass indicating the current direction of travel of the vehicle could be displayed on display unit 364'. Transistors 380 are provided to control the additional LED's and seven-segment displays of display 364'.

The alternative embodiment illustrated in FIG. 10*c* indicates components similar to those previously described by double-primed reference numerals. In this embodiment, an additional connector 382 is provided as an interface to other vehicle systems or subsystems. Thus, no display unit is necessary. IC 352" formats output to connector 382 in a standard or customized output protocol. Standard protocols such as SAE J1850 or SAE J1939 may be accommodated.

Referring now to FIG. 11, an alternative embodiment of a multipurpose display unit for use with a pneumatic tire monitoring system according to the present invention is shown. Multipurpose display unit 388 includes selection/programming buttons, such as mode button 390, which allow a user to set various system parameters and access predetermined system information. A seven segment numerical display area 392 provides a numerical reading of the average pressure sensed in the various vehicle tires. Display 388 also includes an area for display of predetermined messages, such as message 394. A vent 396, provides for transmission of an audible alarm signal generated by a buzzer (such as buzzer 355 of FIGS. 10a–10c) to alert the user to a particular system condition. The buzzer may be utilized as an alarm or during programming to provide audible feedback to the user while programming the system. Display unit 388 also includes a graphical display area as indicated by reference numeral 398. Preferably, the graphical display area includes an indicator corresponding to each of the vehicle tires which may include a spare tire in addition to the mounted vehicle tires.

Referring now to FIG. 12, a prior art digital signaling strategy is illustrated. This strategy utilizes pulsewidth modulation (PWM) with binary symbols. In the strategy illustrated, a "0" is represented by a narrow pulse 400, while a "1" is represented by a relatively wider pulse 402. A predetermined number of sequential bits form a data word. The data word may include data bits in addition to overhead bits, such as synchronization bits, error detection and correction bits, and the like. As applied to a pneumatic tire monitoring system, the signaling strategy illustrated in FIG. 12 having 16-bit data words will provide for up to $2^{16}$ (65,536) different combinations. Thus, if a vehicle, such as a tractor semi-trailer, has 16 wheels, each wheel would have 4096 possible unique identification codes. However, it is desirable to minimize transmission time to conserve power by transmitting the least number of bits to accommodate the required combinations.

An alternative communications strategy according to the present invention is illustrated in FIG. 13. This strategy also utilizes PWM symbols. However, rather than utilizing binary symbols, the present invention utilizes trinary symbols. Thus, a "1" is represented by two wide pulses 410, a "0" is represented by two narrow pulses 412, and a "2" is represented by a long pulse followed by a short pulse. Thus, by utilizing only 10 trinary bits, $3^{10}$ (59,049) different combinations are available. This reduces the number of bits required to be transmitted and allows conservation of power. For a vehicle having 16 tires, this transmission strategy provides for each tire to have 3691 unique identification codes. Furthermore, this communication strategy does not require the use of synchronization bits. Instead, a pulsewidth discriminator allows only the predetermined pulsewidths to pass. Any pulses received which do not match the predetermined pulsewidths are filtered out by the system.

The communication protocol of the present invention also provides for variable length data words. If a particular transponder has information to send in addition to the usual 10-bit data word, an extra bit 416 is added to indicate that the data word has been expanded and more data bits will follow. Extra bit 416 indicates an additional 4 data bits will follow. An extra bit (not shown) may be added after the additional four data bits to indicate yet another additional 4 data bits will follow, etc. This process may be repeated up to a predetermined number of times depending upon the particular application so that a 10-bit data word maybe followed by a predetermined number of additional 4-bit data words.

Figure 14:
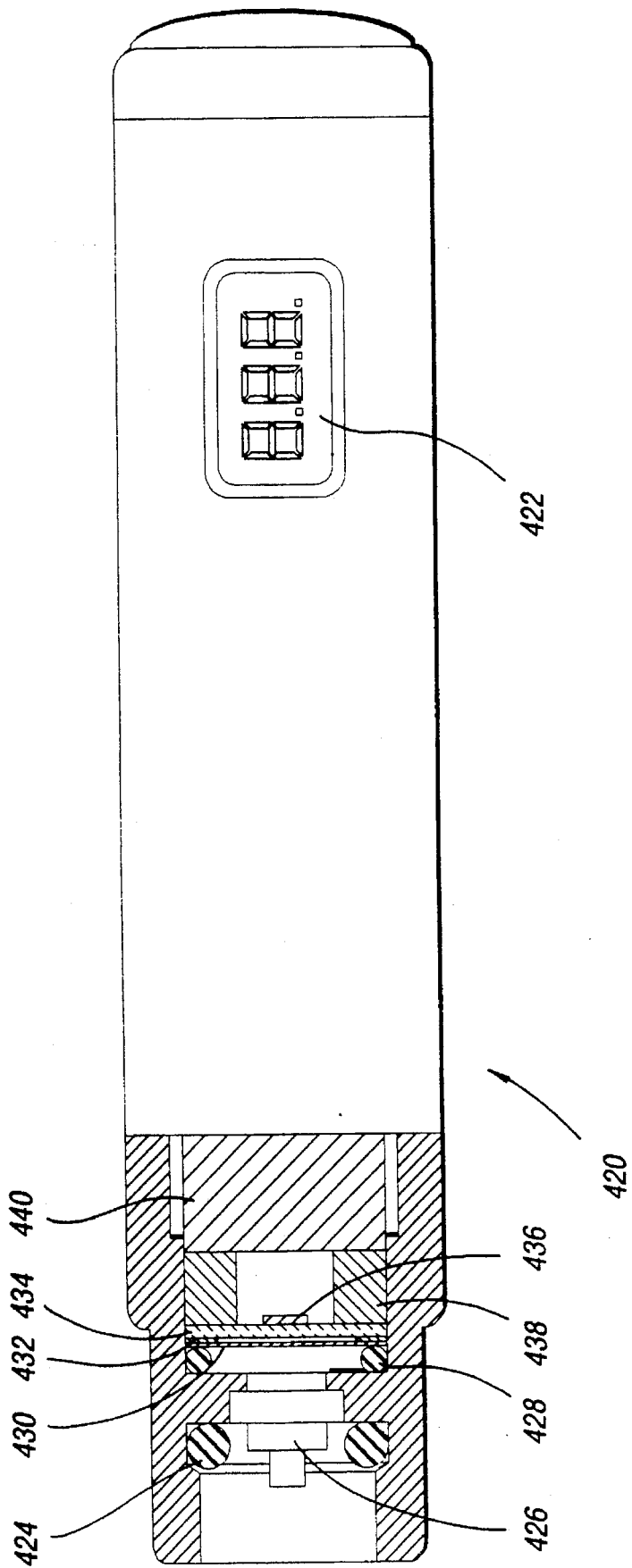
FIG. 14 illustrates a hand-held service tool for use with a pneumatic tire monitoring system according to the present invention.

Referring now to FIG. 14, a hand-held service tool for use with a pneumatic tire monitoring system according to the present invention is shown. Service tool 420 includes a seven-segment display 422 for providing the user with an accurate pressure reading of a pneumatic tire being tested. Service tool 420 includes an O-ring 424 to prevent air from leaking out of the pneumatic tire while a pressure reading is being taken. Push-pin 426 exposes the pressurized air in the tire to the internal pressure sensor. O-ring 428 prevents air from leaking around conductive layer 430. The internal pressure sensor is constructed and operates in accordance with the embodiments discussed above and includes a Mylar spacer 432, a base layer 434, a laser-trimmable resistor 436 and a bushing 438. A processor portion 440 includes additional circuitry in communication with the pressure sensor and the seven-segment display 422 for providing a pressure reading to a user. Furthermore, service tool 420 may be used to reprogram a transponder located within a vehicle tire after the location of the tire has been changed. For example, when a tire is rotated, the central receiving unit must be alerted to this change in location in order to provide accurate information to the user.

Figure 16:
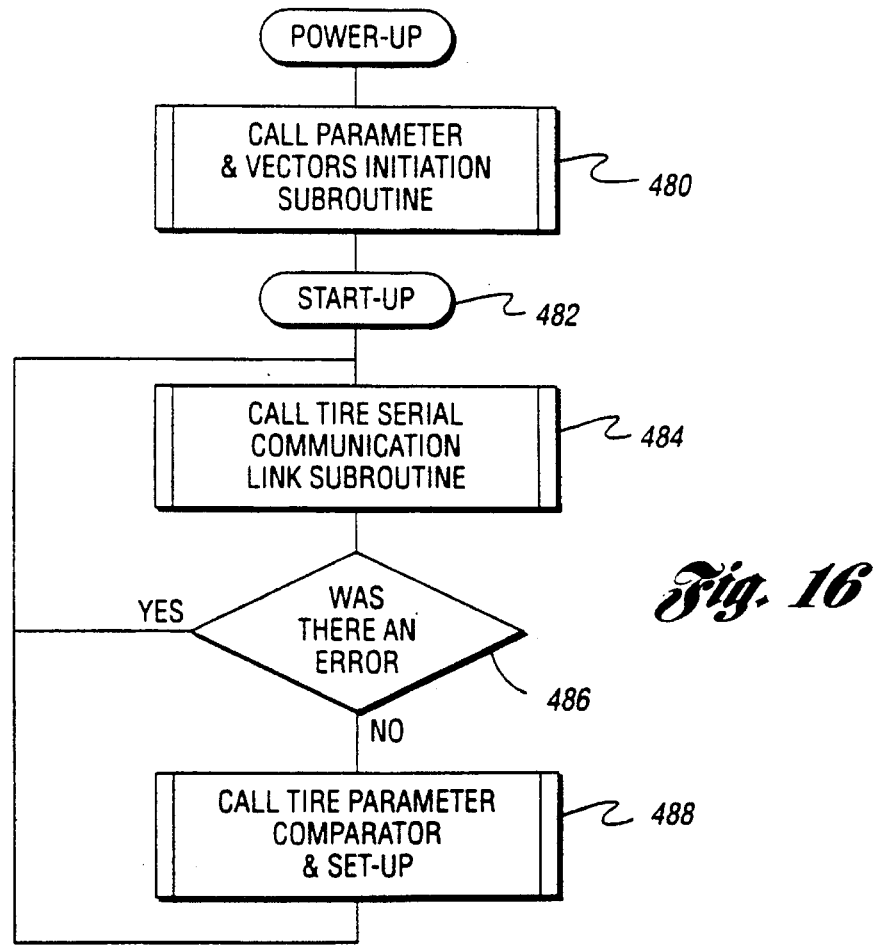
FIG. 16 is a flow chart illustrating operation of a main program for a pneumatic tire monitoring system according to the present invention.

Referring now to FIG. 16, a main program for a pneumatic tire pressure monitoring system according to the present invention is shown. Upon power-up, at step 480, the system parameters and vectors are initiated. The subroutine checks to determine if the system has been programmed or if this is the first time power has been applied. On the first system power-up, all system flags or vectors are initialized to clear alarms and ready the system for tire login as explained in greater detail below. This subroutine also performs a power-on self-test (POST) to detect any system malfunctions such as a short or open circuit, and the like.

Regular program operation begins at step 482 of FIG. 16. Step 484 calls the tire serial communication link subroutine to establish communications with each transponder installed on a vehicle tire. This subroutine is also utilized to detect any errors in transmission and reception. If the transponders which have previously been recognized by the system do not report within a predetermined period of time, a communication error is indicated and step 496 returns control to step 484. After a predetermined number of attempts, the system alerts the operator and then goes into a sleep mode to conserve power. At step 488, the tire parameter comparator and set-up subroutine is called which monitors the currently recognized transponders mounted on the vehicle tires and updates corresponding status vectors (or flags).

Figure 17:
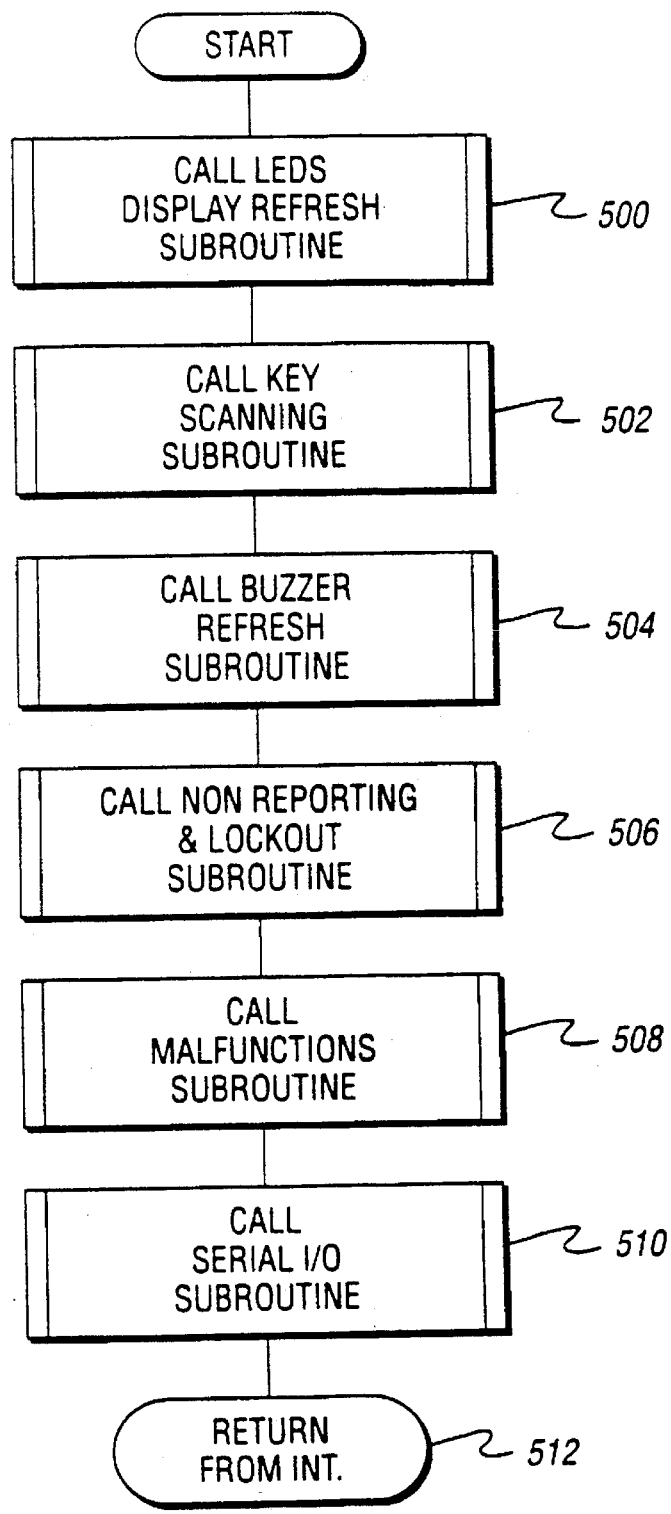
FIG. 17 is a flow chart illustrating an interrupt program for a pneumatic tire monitoring system according to the present invention.

Referring now to FIG. 17 an interrupt procedure is illustrated which is preferably initiated every 200 Ms. At step 500, a subroutine is called which refreshes the display based on the current status vectors. This step checks each tire vector to detect an alarm condition and updates the display accordingly to alert the operator. If a malfunction or low battery is detected, the LEDs and display segments are turned off to conserve power and the user is alerted via a continuous buzzer. If a flat tire is detected, i.e. a tire pressure which is below the predetermined limit, the corresponding area on the display is illuminated and flashes with a period of 400 mS. Once an error or malfunction has been cleared and all tires are within the predetermined inflation limits, all the buzzer and the display lights are turned off.

At block 502, a key-scanning subroutine is called which detects a keypress on the display unit. Any keypress is debounced using a 20 mS delay. For the embodiments which have only one programming key, the mode of operation is determined by the period of time the key is depressed. A keypress which is held less than four (4) seconds silences the alarm (buzzer) while a keypress held between about six (6) and eight (8) seconds performs a system reset and prepares for reprogramming the device. This operation is explained in greater detail below.

With continuing reference to FIG. 17, a buzzer refresh subroutine is called at step 504. This is similar to the LED refresh subroutine called at step 500. However, the buzzer refresh subroutine checks the status vectors and controls the buzzer accordingly. The buzzer may have a rapid, medium, or long beeping to indicate various types of alarms. The buzzer may be reset manually by a keypress as described above. Alternatively, the buzzer may be reset automatically after a predetermined period of time or in response to a predetermined set of conditions.

A reporting and lockout subroutine is called at step 506 of FIG. 17. This subroutine monitors the login of each tire transponder (described in greater detail below) and disables the login process after a predetermined period of time. If a transponder has been previously recognized by the system, i.e. logged in, and has not reported within about 15 minutes, the operator is alerted. Transponders ere allowed approximately 20 minutes to login. After that period has elapsed, no more logins are accepted without performing a system reset. This prevents the receiver from inadvertently recognizing a transponder mounted on a passing vehicle as being mounted on the vehicle of interest.

A malfunctions subroutine is called at step 508 to perform various system tests and to update the corresponding status vectors. This subroutine actually changes the status vectors while the previous subroutines only read the status vectors and respond to the information contained therein. Thus, the malfunctions subroutine is responsible for monitoring the various transponders and the communication link to set the associated status vectors.

As also illustrated in FIG. 17, a serial input/output (I/O) subroutine is called at step 510 to monitor the serial data link. The system may transmit or receive information via the optic link or an SAE J1850 or SAE J1939 communications link. This information may include the current pressure readings from each tire pressure transponder, system alarms, malfunctions, or the like. At step 512, control is returned from the interrupt processing programming to the main program or subroutine which was operating at the time the interrupt occurred.

Figure 18:
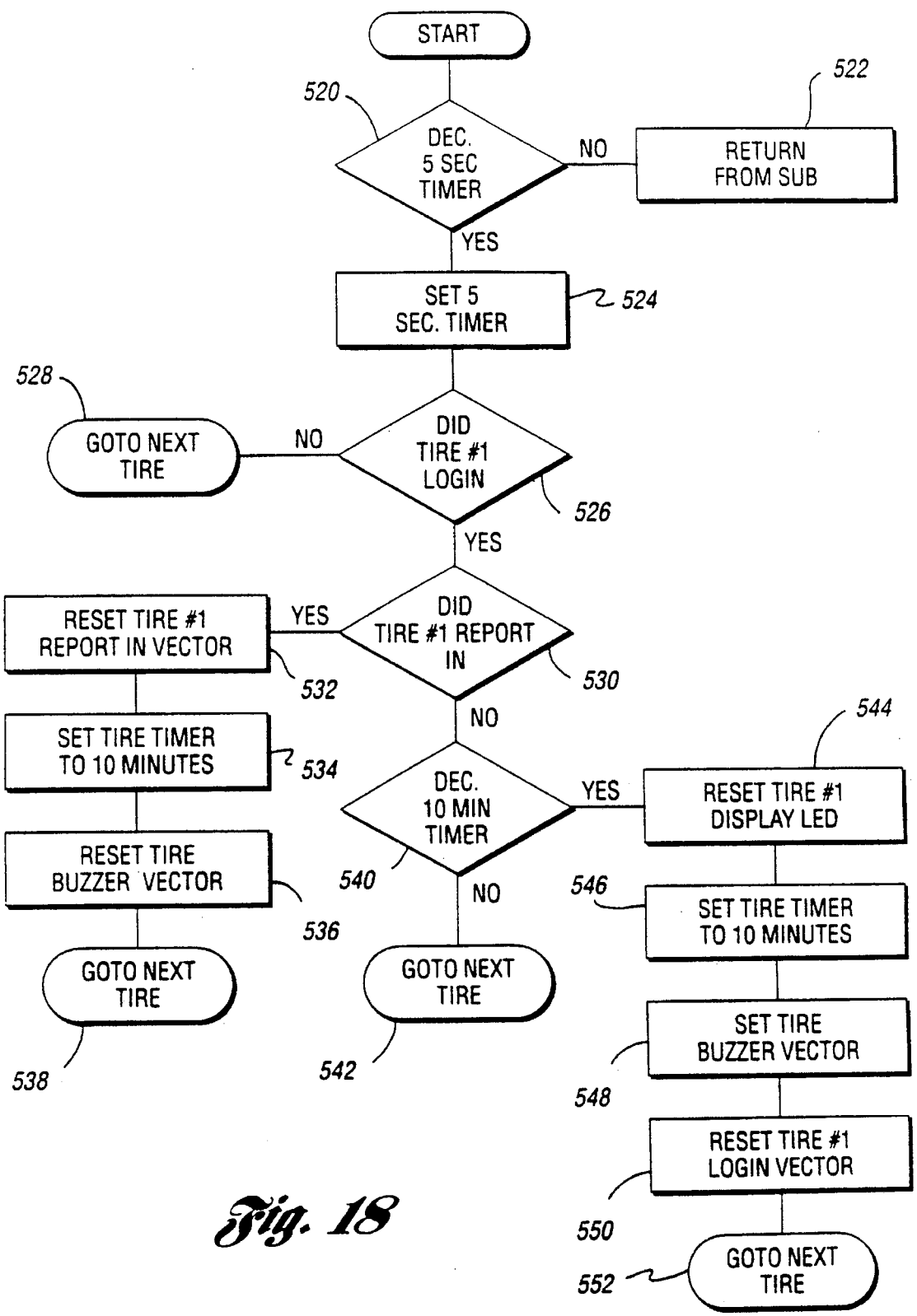
FIGS. 18 and 19 are flow charts illustrating a tire reporting and alarm procedure for a pneumatic tire monitoring system according to the present invention.
Figure 19:
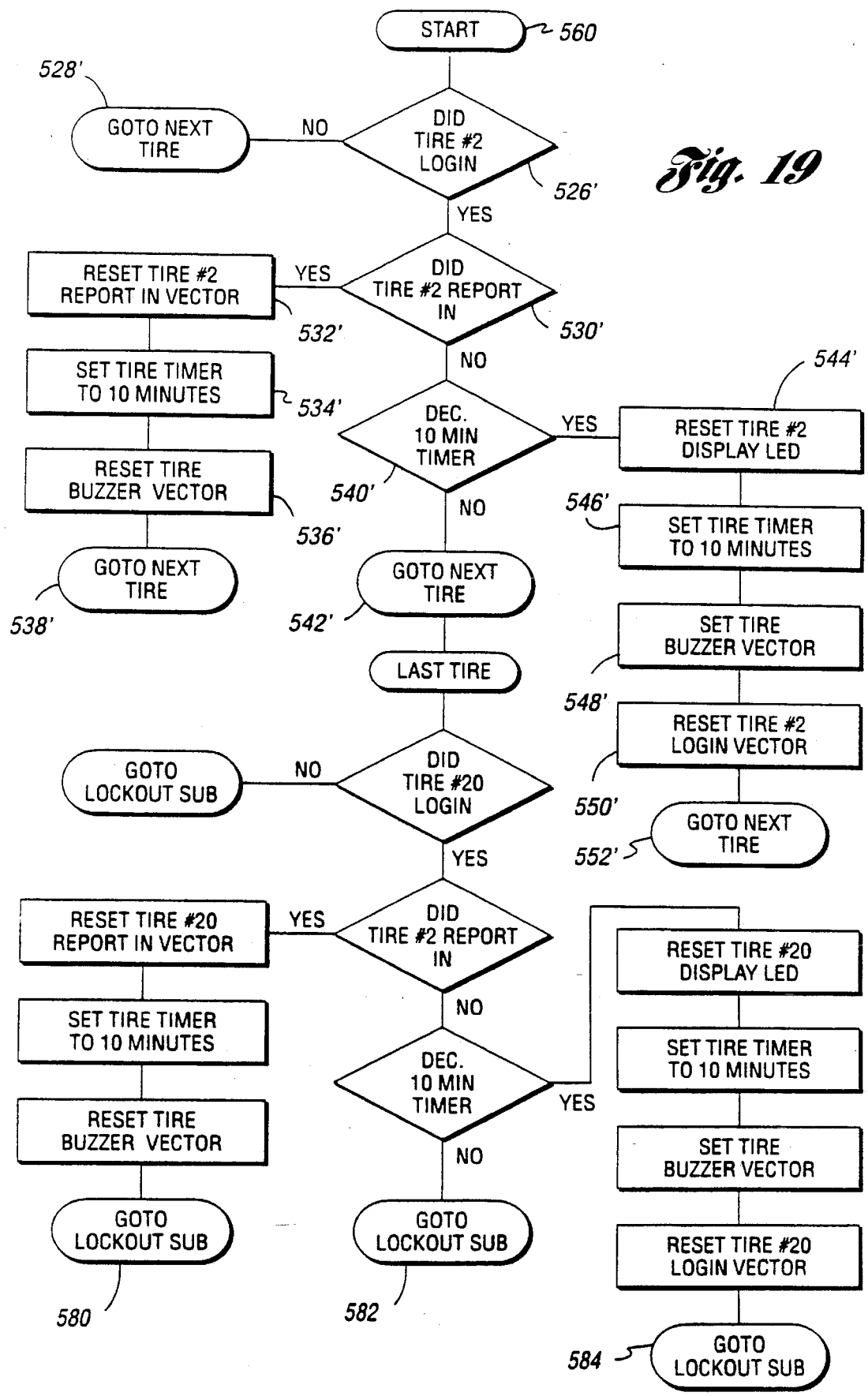

Referring now to FIGS. 18 and 19, a detailed flowchart illustrating transponder reporting and alarm functions of a pneumatic tire pressure monitoring system according to the present invention is shown. At step 520, a timer is examined to determine if the time period has elapsed for all of the transponders to report and/or login. Preferably, the timer is set to five (5) seconds. If the timer has not elapsed, control passes to block 522 to return to the calling routine. Otherwise, the timer is reset to its starting value at block 524. Block 526 determines whether a transponder assigned to the first tire of the twenty available tires has been recognized by the system. If the first tire transponder has not been logged in then the system waits for the code indicating the next tire as indicated by block 528 and illustrated in detail in FIG. 19.

As also shown in FIG. 18, if the first tire has logged in, then block 530 determines whether that tire has reported a current status within the last five second time period. If the first tire has reported its status, i.e. battery condition, pressure reading, alarm status, or the like, then the status vector is reset by block 532. Similarly, a tire timer is initialized to ten (10) minutes at block 534 and the tire buzzer vector is reset by block 536. Control then passes to the next tire in sequence as indicated by block 538 and illustrated in FIG. 19.

At block 540 of FIG. 18, the ten (10) minute timer initiated at block 534 is decremented and tested. If the timer has not elapsed, then control passes to the next tire in the sequence as indicated by block 542 and illustrated in FIG. 19. Otherwise, an alarm is triggered since the first tire has been recognized by the system but has not reported within the last ten minutes. Block 544 then sets the display LED (or other indication) corresponding to the first tire and another ten minute timer is set at block 546. At block 548, the buzzer bit within the status vector is set so that the buzzer will be triggered on the subsequent buzzer update cycle. At block 550 the first tire login vector is reset before control passes to the next tire in the sequence as indicated by block 552.

Referring now to FIG. 19, program control continues in a manner similar to that illustrated in FIG. 18 as indicated by primed reference numerals with similar numerals corresponding to similar functions for subsequent transponders mounted on various vehicle tires. This process continues until the system has cycled through twenty tires with control of the last tire login indicated generally by reference numeral 570. Control then passes via blocks 580, 582, and/or 584 to a lockout subroutine illustrated in detail in FIGS. 20 and 21.

Figure 20:
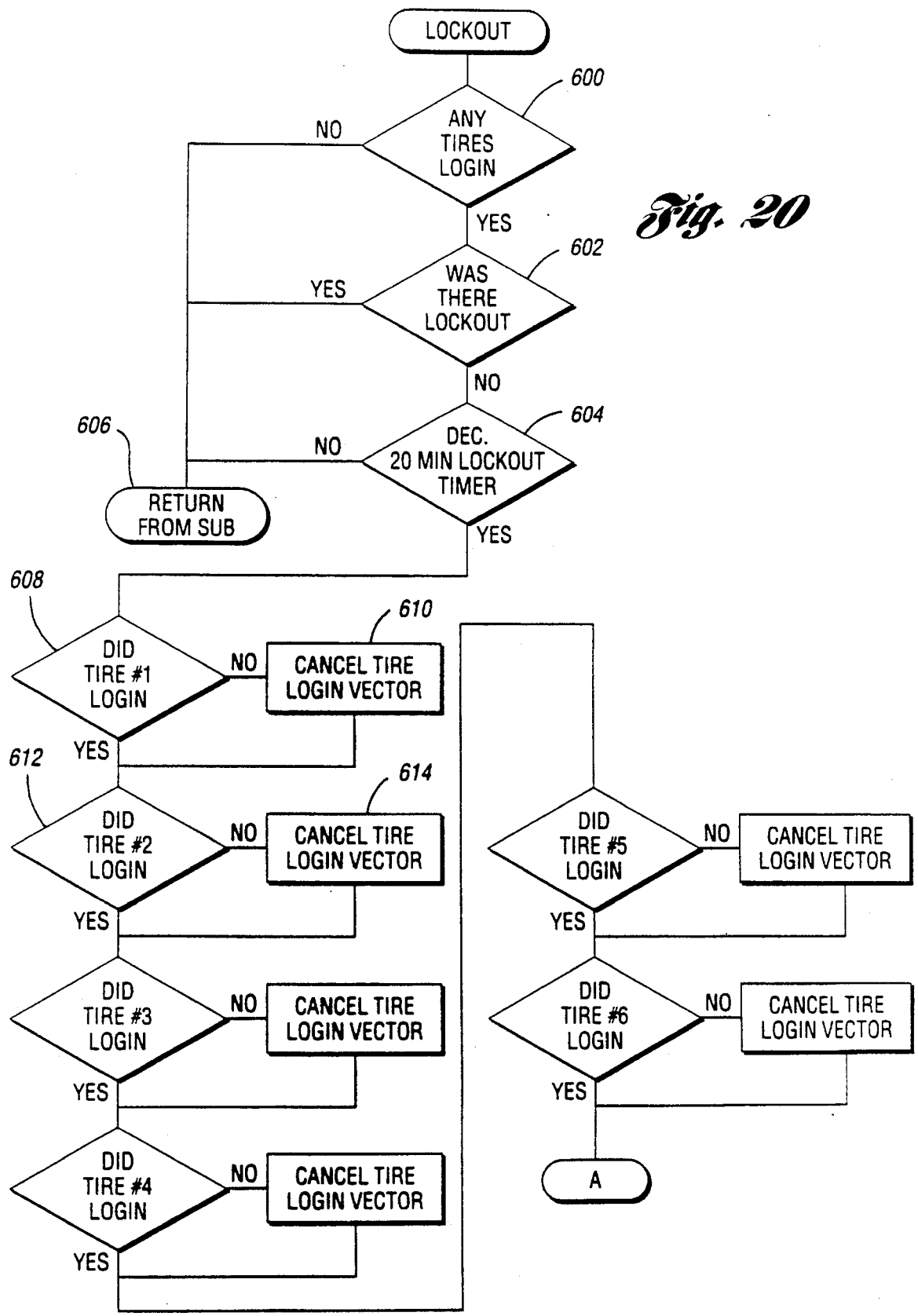
FIGS. 20 and 21 are flow charts illustrating a lockout procedure for a pneumatic tire monitoring system according to the present invention.
Figure 21:
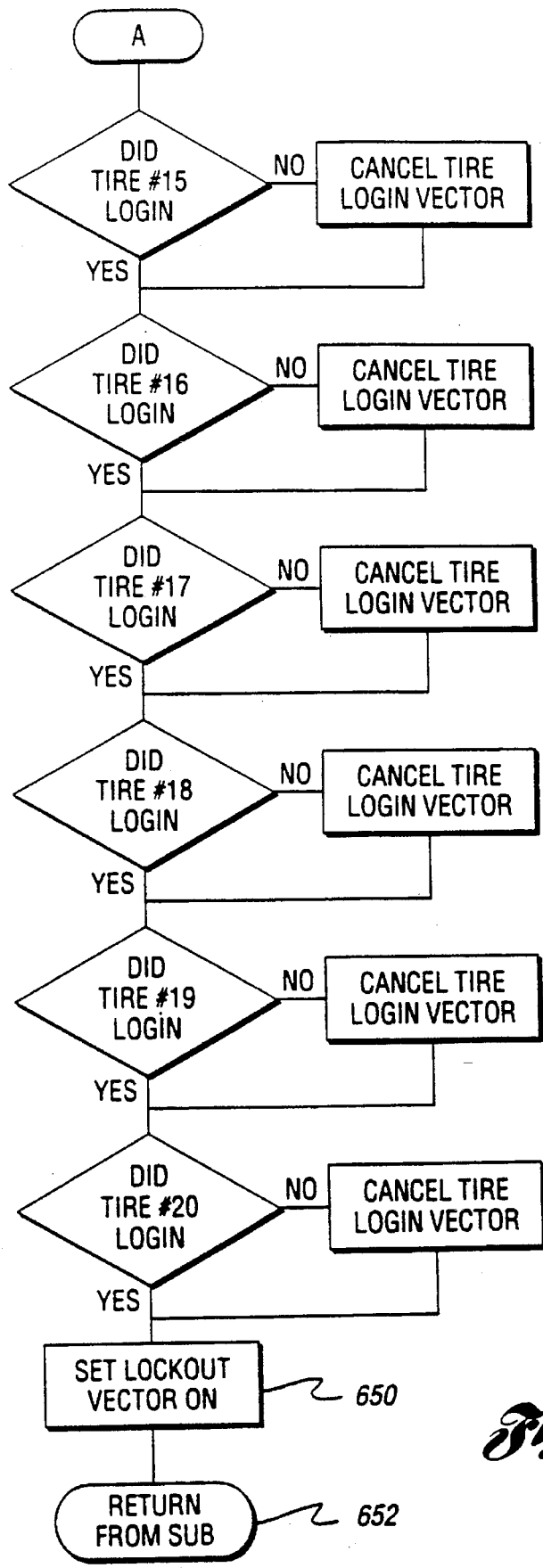

Referring now to FIGS. 20 and 21, a lockout subroutine is illustrated for use with a pneumatic tire monitoring system according to the present invention. Block 600 determines whether any of the transponders corresponding available twenty vehicle tires has logged in yet. If no tire has logged in, control is returned to the calling routine via block 606. If at least one tire has logged in, then a lockout vector is examined at step 602 to determine if further transponders are prohibited from being recognized by the system. If a lockout has been indicated, no further transponders are recognized until a system reset occurs and control returns to the calling routine.

Block 604 of FIG. 20 decrements the counter and determines whether the twenty (20) minute period has expired for automatic logins. If the period has not yet expired, control returns to the calling routine via block 606. Otherwise, control passes to block 608 which determines whether the first tire has logged in during the allotted period. If not, a corresponding login vector is canceled at block 610. This prevents another transponder from being recognized by the system as the first tire. Similarly, since the first tire has not logged in within the allotted period, cancellation of the login vector prevents a reporting error from being generated. A reporting error indicates that a report is expected but not received and may indicate that the transponder is malfunctioning or has been stolen.

Control continues in a similar fashion with blocks 612 and 614 and the subsequent blocks of FIGS. 20 and 21 until all the available tires have either been logged in or canceled. At block 650 of FIG. 21, a status vector is set to indicate that the lockout cycle has been completed and control returns to the calling routine at block 652.

Thus it is understood that while the forms of the invention herein shown and described include the best mode contemplated for carrying out the invention, it is not intended to illustrate all possible forms thereof. It should also be understood that the words used herein are descriptive rather than limiting, and that various changes may be made without departing from the spirit and scope of the invention disclosed.

What is claimed is:

1. A pressure transducer for use with a pneumatic tire monitoring system, the transducer comprising:

a nonconductive resilient layer for responding to a change in pressure;

a piezo-resistive layer fixed to the resilient layer wherein the piezo-resistive layer consists essentially of between about 10% and about 20% activated N-type semiconductor material, between about 40% and about 60% of one of the group consisting of molybdenum disulfide, titanium, bismuth oxide, and between about 20% and about 50% of one of the group consisting of alkyd and silicone binder so as to produce a substantially constant resistance while under a substantially constant load.

2. The pressure transducer of claim 1 wherein the resilient layer consists essentially of silicone rubber.

3. The pressure transducer of claim 1 further comprising:

a substantially flat nonconductive substrate;

a plurality of conductive elements attached to the substrate, each of the plurality being electrically insulated from remaining conductive elements;

wherein the piezo-resistive layer contacts at least two of the plurality of conductive elements with a surface area which is responsive to the change in pressure so as to produce a variable resistance between the at least two conductive elements.

4. The pressure transducer of claim 3 wherein the nonconductive resilient layer includes a substantially cylindrical portion and a substantially hemispherical portion and wherein the piezo-resistive layer forms a thin film over the substantially hemispherical portion to improve response linearity of the transducer.

5. The pressure transducer of claim 3 further comprising:

a variable resistor connected across at least two of the plurality of conductive elements for calibrating the pressure transducer to accommodate manufacturing variations in the piezoresistive layer.

6. The pressure transducer of claim 5 wherein the variable resistor comprises a laser-trimmable resistor.

7. The pressure transducer of claim 3 wherein the plurality of conductive elements comprises:

a first conductive element having a first array of substantially evenly spaced extensions; and a second conductive element having a second array of substantially evenly spaced extensions wherein the second array is interposed among the first array.

8. The pressure transducer of claim 3 wherein the plurality of conductive elements comprises:

a common conductive element having first and second arrays of substantially evenly spaced extensions;

a second conductive element having a third array of substantially evenly spaced extensions, the first array of the common element and the third array of the second element being interposed to define a first region of alternating conductive elements; and a third conductive element having a fourth array of substantially evenly spaced extensions, the second array of the common element being interposed among the fourth array of the third element so as to define a second region of alternating conductive elements.

9. The pressure transducer of claim 8 further comprising:

a first variable resistor connected across the common conductive element and the second conductive element for calibrating the first region of the pressure transducer; and a second variable resistor connected across the common conductive element and the third conductive element for calibrating the second region of the pressure transducer.

10. A pressure transducer for use with a pneumatic tire monitoring system, the transducer comprising:

a nonconductive resilient base having a substantially hemispherical portion;

a variably conductive layer deposited on the substantially hemispherical portion wherein the conduction varies as a function of pressure exerted on the nonconductive base;

a substantially flat nonconductive substrate;

a plurality of conductive elements attached to the substrate, each of the plurality being electrically insulated from remaining conductive elements;

wherein the conductive layer contacts at least two of the plurality of conductive elements with a surface area which is responsive to the pressure so as to produce a variable conductance between the at least two of the plurality of conductive elements indicative of the pressure.

11. The pressure transducer of claim 10 wherein the base includes a substantially cylindrical portion extending from the substantially hemispherical portion and an integral disc-shaped lip extending around the substantially cylindrical portion and connected thereto by an arcuate portion to enhance resiliency of the substantially hemispherical portion relative to the lip.

12. The pressure transducer of claim 10 wherein the conductive layer consists essentially of between about 10% and about 20% activated N-type semiconductor material, between about 40% and about 60% of one of the group consisting of molybdenum disulfide, titanium, bismuth oxide, and between about 20% and about 50% of one of the group consisting of alkyd and silicone binder so as to produce a substantially constant resistance while under a substantially constant load.

13. The pressure transducer of claim 10 wherein the conductive layer is divided into first and second regions electrically insulated from each other by a portion of the nonconductive base extending therebetween.

14. The pressure transducer of claim 13 wherein the plurality of conductive elements comprises:

a common conductive element having first and second arrays of substantially evenly spaced extensions;

a second conductive element having a third array of substantially evenly spaced extensions, the first array of the common element and the third array of the second element being interposed to define a first region of alternating conductive elements for contacting the first region of the conductive layer; and a third conductive element having a fourth array of substantially evenly spaced extensions, the second array of the common element being interposed among the fourth array of the third element so as to define a second region of alternating conductive elements for contacting the second region of the conductive layer.

15. The pressure transducer of claim 14 further comprising:

a first variable resistor connected across the common conductive element and the second conductive element for calibrating the first region of the pressure transducer; and a second variable resistor connected across the common conductive element and the third conductive element for calibrating the second region of the pressure transducer.

16. The pressure transducer of claim 14 further comprising:

a compensation circuit for improving linearity of response of the pressure transducer including an inverter coupled to the first conductive element and a differential amplifier, the differential amplifier having first and second inputs coupled to an output of the inverter and to the second conductive element, respectively.

17. The pressure transducer of claim 16 wherein the compensation circuit further comprises:

a first operational amplifier coupled to the output of the inverter and having negative feedback including a capacitor and a diode connected in parallel, an output of the first amplifier being coupled to the first input of the differential amplifier; and a second operational amplifier coupled to the second conductive element and having negative feedback including a capacitor and a diode connected in parallel, an output of the second amplifier being coupled to the second input of the differential amplifier.

18. The pressure transducer of claim 10 further comprising:

at least one variable resistor connected across a pair of the plurality of conductive elements for calibrating the pressure transducer to accommodate manufacturing variations of the conductive layer.

19. A pressure transducer for use in a pneumatic tire monitoring system, the transducer comprising:

a nonconductive resilient diaphragm having a conductive layer deposited thereon;

a substantially flat nonconductive substrate;

a plurality of conductive elements attached to the substrate, each of the plurality being electrically insulated from remaining conductive elements;

a nonconductive spacer disposed between the diaphragm and the plurality of conductive elements, the spacer including an aperture allowing the conductive layer to contact at least two of the plurality of conductive elements with a surface area which increases with increasing pressure so as to produce a variable conductance between the at least two of the plurality of conductive elements.

20. The pressure transducer of claim 19 wherein the conductive layer is separated into first and second regions electrically insulated from each other by a portion of the nonconductive resilient diaphragm extending therebetween.

21. The pressure transducer of claim 20 wherein the plurality of conductive elements includes a common conductive element having first and second arrays of substantially evenly spaced extensions, a second conductive element having a third array of substantially evenly spaced extensions, the first array of the common element and the third array of the second element being interposed to define a first region of alternating conductive elements for contacting the first region of the conductive layer, and a third conductive element having a fourth array of substantially evenly spaced extensions, the second array of the common element being interposed among the fourth array of the third element so as to define a second region of alternating conductive elements for contacting the second region of the conductive layer, the pressure transducer further comprising:

a first variable resistor connected across the common conductive element and the second conductive element for calibrating the first region of the pressure transducer;

a second variable resistor connected across the common conductive element and the third conductive element for calibrating the second region of the pressure transducer; and a compensation circuit for improving linearity of response of the pressure transducer including an inverter coupled to the first conductive element and a differential amplifier wherein the differential amplifier includes first and second inputs coupled to an output of the inverter and to the second conductive element, respectively.

\* \* \* \* \*

UNITED STATES PATENT AND TRADEMARK OFFICE
CERTIFICATE OF CORRECTION

PATENT NO. : 5,581,023
DATED : December 3, 1996
INVENTOR(S) : Michael Handfield, et al.

It is certified that error appears in the above-indentified patent and that said Letters Patent is hereby corrected as shown below:

Column 15, line 1, after "seven" insert -- - -- (hyphen);

Column 15, line 59, replace "maybe" with --may be--;

Column 17, line 15, replace "ere" with --are--;

Title page [62], after "Oct. 31, 1994" delete "abandoned" and insert --pending--;

Signed and Sealed this

Fourteenth Day of October, 1997

Attest:

BRUCE LEHMAN

*Attesting Officer*  *Commissioner of Patents and Trademarks*